(12) United States Patent
Teranishi

(10) Patent No.: US 12,585,096 B2
(45) Date of Patent: Mar. 24, 2026

(54) CAMERA TELECENTRIC LENS

(71) Applicant: Changzhou AAC Raytech Optronics Co., Ltd., Changzhou City (CN)

(72) Inventor: Takaaki Teranishi, Osaka (JP)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 310 days.

(21) Appl. No.: 18/402,737

(22) Filed: Jan. 3, 2024

(65) Prior Publication Data

US 2025/0102782 A1      Mar. 27, 2025

(30) Foreign Application Priority Data

Sep. 22, 2023    (CN) .......................... 202311236718.6

(51) Int. Cl.
| | |
|---|---|
| *G02B 13/22* | (2006.01) |
| *G02B 9/64* | (2006.01) |
| *G02B 27/00* | (2006.01) |

(52) U.S. Cl.
CPC .............. *G02B 13/22* (2013.01); *G02B 9/64* (2013.01); *G02B 27/0025* (2013.01)

(58) Field of Classification Search
CPC ...... G02B 13/22; G02B 9/64; G02B 27/0025; G02B 13/0045

USPC .......................................................... 359/663
See application file for complete search history.

(56) References Cited

U.S. PATENT DOCUMENTS

| | | | |
|---|---|---|---|
| 2007/0041102 A1* | 2/2007 | Kuo ................... | G02B 15/1425 |
| | | | 359/680 |
| 2009/0052050 A1* | 2/2009 | Kweon .................. | G02B 13/06 |
| | | | 359/668 |
| 2009/0303610 A1* | 12/2009 | Hsu ................ | G02B 15/144113 |
| | | | 359/687 |
| 2023/0204775 A1* | 6/2023 | Chen .................. | G02B 27/0068 |
| | | | 356/4.01 |
| 2024/0085667 A1* | 3/2024 | Wu .......................... | G02B 9/64 |

* cited by examiner

*Primary Examiner* — Mohammed A Hasan

(74) *Attorney, Agent, or Firm* — Wiersch Law Group

(57) ABSTRACT

The present disclosure relates to the field of camera optical lenses, and discloses a camera telecentric lens. The camera telecentric lens includes from an object side to an image side: a first lens, a second lens, a third lens, a fourth lens, and a fifth lens, a sixth lens, a seventh lens, an eighth lens and ninth lens, following relational expressions are satisfied: $1.980 \leq n2 \leq 2.300$; $-0.600 \leq f8/f \leq -0.050$; $0.600 \leq R4/R3 \leq 4.000$; and $0.145 \leq NA*f/WD \leq 0.220$. The camera telecentric lens has good optical performance and high magnification, and can meet the precision detection requirement of a machine vision system.

13 Claims, 14 Drawing Sheets

10

OBJ    L1 L2 L3 L4 L5 L6 BS    S1 L7 L8          L9          si

Lateral Color

Micrometer

Field Curvature                    Distortion

Millimeter                    Percentage

20

Longitudinal Aberration

Millimeter

Lateral Color

Micrometer

Field Curvature                    Distortion

Millimeter                          Percentage

40

50

Longitudinal Aberration

Millimeter

60

Longitudinal Aberration

Millimeter

Longitudinal Aberration

Millimeter

Lateral Color

Micrometer

CAMERA TELECENTRIC LENS

TECHNICAL FIELD

The present disclosure relates to the field of camera optical lenses, in particular to a camera telecentric lens suitable for industrial and machine vision detection.

BACKGROUND

With the development of industrial automation and the popularization of machine vision, industrial camera lenses are widely used in the fields of defect detection, size measurement, security monitoring and the like, and camera telecentric lenses are widely used in the fields of precision measurement, non-contact optical measurement and the like due to the unique technical advantage that change of object distance do not affect the magnification of images. With the development of technology and the increase of diversified requirements of users and the requirements of the system on the imaging quality are improving, the nine-piece lens gradually appearing in the lens design. There is an urgent need for camera telecentric lens with good optical performance and high magnification to meet the precision detection of machine vision system.

SUMMARY

In view of the above problems, an object of the present disclosure is to provide a camera telecentric lens, which can obtain good optical performance and high magnification, and meet the requirements of precision detection of a machine vision system.

In order to solve the above technical problem, an embodiment of the present disclosure provides a camera telecentric lens. The camera telecentric lens includes: from an object side to an image side: a first lens, a second lens, a third lens, a fourth lens, a fifth lens, a sixth lens, a seventh lens, an eighth lens and a ninth lens;

wherein a focal length of the camera telecentric lens is f, a refractive index of the second lens is n2, a central curvature radius of an object-side surface of the second lens is R3, a central curvature radius of an image-side surface of the second lens is R4, a focal length of the eighth lens is f8, a working distance of the camera telecentric lens is WD, and a numerical aperture of the camera telecentric lens is NA, following relational expressions are satisfied:

$$1.980 \le n2 \le 2.300;$$

$$-0.600 \le f8/f \le -0.050;$$

$$0.600 \le R4/R3 \le 4.000;$$

and $$0.145 \le NA * f/WD \le 0.220.$$

As an improvement, a dispersion coefficient of the third lens is v3, a dispersion coefficient of the fourth lens is v4, a following relational expression is satisfied:

$$50.000 \le v4 - v3 \le 80.000.$$

As an improvement, a total optical length from an object-side surface of the first lens to an image plane of the camera optical lens along an optic axis of the camera telecentric lens is TTL, a following relational expression is satisfied:

$$2.000 \le TTL/f \le 5.000.$$

As an improvement, the first lens has a positive refractive power, and an image-side surface of the first lens is convex in a paraxial region;

a focal length of the first lens is f1, a central curvature radius of an object-side surface of the first lens is R1, a central curvature radius of the image-side surface of the first lens is R2, an on-axis thickness of the first lens is d1, and the total optical length from the object-side surface of the first lens to an image plane of the camera optical lens along an optic axis of the camera telecentric lens is TTL, following relational expressions are satisfied:

$$0.54 \le f1/f \le 1.95;$$

$$-0.50 \le (R1 + R2)/(R1 - R2) \le 4.01;$$

$$0.04 \le d1/TTL \le 0.06.$$

As an improvement, an object-side surface of the second lens is convex in a paraxial region, and an image-side surface of the second lens is concave in the paraxial region;

a focal length of the second lens is f2, an on-axis thickness of the second lens is d3, and the total optical length from an object-side surface of the first lens to an image plane of the camera optical lens along an optic axis of the camera telecentric lens is TTL, following relational expressions are satisfied:

$$-1.95 \le f2/f \le 1.70;$$

and $$0.01 \le d3/TTL \le 0.05.$$

As an improvement, an object-side surface of the third lens is convex in the paraxial region, and an image-side surface of the third lens is concave in the paraxial region;

a focal length of the third lens is f3, a central curvature radius of the object-side surface of the third lens is R5, a central curvature radius of the image-side surface of the third lens is R6, an on-axis thickness of the third lens is d5, and a total optical length from an object-side surface of the first lens to an image plane of the camera optical lens along an optic axis of the camera telecentric lens is TTL, following relational expressions are satisfied:

$$-0.44 \le f3/f \le 3.20;$$

$$1.44 \le (R5 + R6)/(R5 - R6) \le 8928.08;$$

and $$0.00 \le d5/TTL \le 0.02.$$

As an improvement, the fourth lens has a positive refractive power, an object-side surface of the fourth lens is convex in the paraxial region, and an image-side surface of the fourth lens is convex in the paraxial region;

a focal length of the fourth lens is f4, a central curvature radius of the object-side surface of the fourth lens is R7, a central curvature radius of the image-side surface of the fourth lens is R8, an on-axis thickness of the fourth lens is d7, and the total optical length from an object-side surface of the first lens to an image plane of the camera optical lens along an optic axis of the camera telecentric lens is TTL, following relational expressions are satisfied:

$$0.18 \le f4/f \le 0.35;$$

$$-0.35 \le (R7 + R8)/(R7 - R8) \le -0.10;$$

and $$0.01 \le d7/TTL \le 0.05.$$

As an improvement, the fifth lens has a negative refractive power, an object-side surface of the fifth lens is concave in the paraxial region, and an image-side surface of the fifth lens is concave in the paraxial region;

a focal length of the fifth lens is f5, a central curvature radius of the object-side surface of the fifth lens is R9, a central curvature radius of the image-side surface of the fifth lens is R10, an on-axis thickness of the fifth lens is d9, and a total optical length from an object-side surface of the first lens to an image plane of the camera optical lens along an optic axis of the camera telecentric lens is TTL, following relational expressions are satisfied:

$$-0.25 \le f5/f \le -0.09;$$

$$0.12 \le (R9 + R10)/(R9 - R10) \le 0.45;$$

$$0.00 \le d9/TTL \le 0.03.$$

As an improvement, the sixth lens has a positive refractive power, an object-side surface of the sixth lens is convex in the paraxial region, and an image-side surface of the sixth lens is convex in the paraxial region;

a focal length of the sixth lens is f6, a central curvature radius of the object-side surface of the sixth lens is R11, a central curvature radius of the image-side surface of the sixth lens is R12, a thickness on-axis of the sixth lens is d11, and the total optical length from an object-side surface of the first lens to an image plane of the camera optical lens along an optic axis of the camera telecentric lens is TTL, following relational expressions are satisfied:

$$0.15 \le f6/f \le 0.29;$$

$$-1.00 \le (R11 + R12)/(R11 - R12) \le -0.33;$$

and $$0.01 \le d11/TTL \le 0.06.$$

As an improvement, the seventh lens has a positive refractive power;

a focal length of the seventh lens is f7, a central curvature radius of an object-side surface of the seventh lens is R13, a central curvature radius of an image-side surface of the seventh lens is R14, an on-axis thickness of the seventh lens is d13, and a total optical length from an object-side surface of the first lens to an image plane of the camera optical lens along an optic axis of the camera telecentric lens is TTL, following relational expressions are satisfied:

$$0.10 \le f7/f \le 0.95;$$

$$-2.80 \le (R13 + R14)/(R13 - R14) \le 2.10; \text{ and}$$

$$0.00 \le d13/TTL \le 0.06.$$

As an improvement, the eighth lens has a negative refractive power, and an object-side surface of the eighth lens is concave in the paraxial region;

a central curvature radius of the object-side surface of the eighth lens is R15, a central curvature radius of the image-side surface of the eighth lens is R16, an on-axis thickness of the eighth lens is d15, and a total optical length from an object-side surface of the first lens to an image plane of the camera optical lens along an optic axis of the camera telecentric lens is TTL, following relational expressions are satisfied:

$$-2.00 \le (R15 + R16)/(R15 - R16) \le 0.16; \text{ and}$$

$$0.00 \le d15/TTL \le 0.03.$$

As an improvement, the ninth lens has a positive refractive power;

a focal length of the ninth lens is f9, a central curvature radius of an object-side surface of the ninth lens is R17, a central curvature radius of an image-side surface of the ninth lens is R18, an on-axis thickness of the eighth lens is d17, and a total optical length from an object-side surface of the first lens to an image plane of the camera optical lens along an optic axis of the camera telecentric lens is TTL, following relational expressions are satisfied:

$$0.64 \le f9/f \le 2.97;$$

$$-32.02 \le (R17 + R18)/(R17 - R18) \le 2.00; \text{ and}$$

$$0.01 \le d17/TTL \le 0.08.$$

As an improvement, the first lens, the second lens, the third lens, the fourth lens, the fifth lens, the sixth lens, the seventh lens, the eighth lens and the ninth lens are all made of glass.

DESCRIPTION OF EMBODIMENTS

In order to more clearly illustrate objectives, technical solutions, and advantages of embodiments of the present disclosure, the technical solutions in embodiments of the present disclosure are clearly and completely described in details with reference to the accompanying drawings. However, those of ordinary skill in the art will appreciate that in various embodiments of the present disclosure, numerous technical details are set forth for the reader to better understand the present disclosure. However, the technical solutions claimed in the present disclosure can be implemented even without these technical details and various variations and modifications based on the following embodiments.

Embodiment 1

Figure 1:
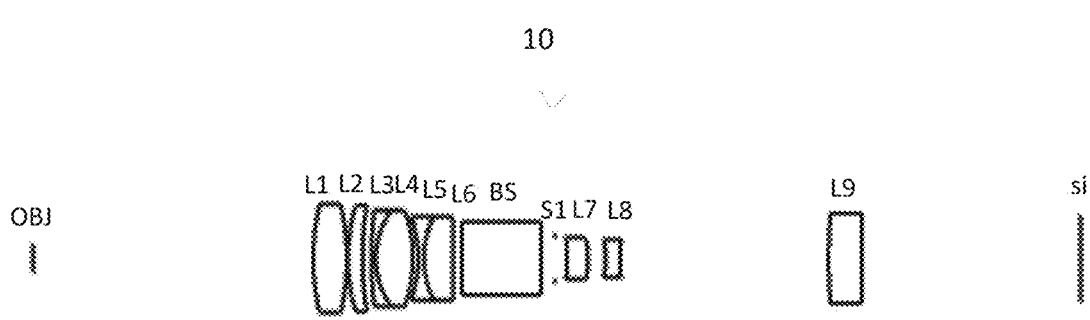
FIG. 1 is a structural schematic diagram of a camera telecentric lens as described in Embodiment 1 of the present disclosure.

Referring to the drawings, the present disclosure provides a camera telecentric lens 10. FIG. 1 shows a camera telecentric lens 10 as described in Embodiment 1 of the present disclosure, the camera telecentric lens 10 includes nine lenses. Specifically, the camera telecentric lens 10 includes: a first lens L1, a second lens L2, a third lens L3, a fourth lens L4, a fifth lens L5, a sixth lens L6, a beam splitting prism BS, an aperture 51, a seventh lens L7, an eighth lens L8, and a ninth lens L9. An optical element such as an optical filter may be provided between a ninth lens L9 and an image surface Si.

In this embodiment, the light is incident from the left side, and an object surface OBJ and an image surface Si are provided from left to right in the light incident direction. In other optional embodiments, the light may also be incident from the right side, that is, the object surface OBJ and the image surface Si are provided from right to left in the light incident direction.

A refractive index of the second lens L2 is defined as n2, $1.980 \leq n2 \leq 2.300$, a value range of the refractive index of the second lens L2 is specified, and a high-refractive-index material is used to effectively control a front-end aperture.

A focal length of the camera telecentric lens 10 is defined as f, a focal length of the eighth lens L8 is defined as f8, $-0.600 \leq f8/f \leq -0.050$, a ratio of the focal length f of the eighth lens L8 to a focal length f of the camera telecentric lens 10 is specified, and the optical focal length of the camera telecentric lens 10 is reasonably allocated, so that the camera telecentric lens 10 has better imaging quality and lower sensitivity.

A central curvature radius of the object-side surface of the second lens L2 is defined as R3, a central curvature radius of an image-side surface of the second lens L2 is defined as R4, $0.600 \leq R4/R3 \leq 4.000$, a shape of the second lens L2 is specified, and within the range of the relational expression, the deflection degree of light passing through the lens can be alleviated, which is beneficial to correcting astigmatism and distortion of the camera telecentric lens 10, so that the |Distortion|≤0.04%, which meets the high-precision detection requirement of the machine vision system.

A working distance of the camera telecentric lens (that is, an on-axis distance from the object surface to an object-side surface of the first lens L1) is defined as WD, a numerical aperture of the camera telecentric lens is defined as NA, $0.145 \leq NA*f/WD \leq 0.220$, which specifies the conditions met by the numerical aperture and resolution of the camera telecentric lens 10, and within a range of the relational expression, the camera telecentric lens 10 has a larger numerical aperture and a stronger resolution.

When the distance from an object-side surface of the first lens L1 of the camera telecentric lens 10 to the observed object, the total optical length from the object-side surface of the first lens to an image plane of the camera optical lens along an optic axis, the numerical aperture, the focal length, the central curvature radius of the object-side surface of the related lens and the central curvature radius of the image-side surface satisfy the above relational expression, the camera telecentric lens 10 can have good optical performance and high magnification, and can meet the precision detection of the machine vision system, wherein the magnification can reach 3 times.

The camera telecentric lens 10 of the present disclosure adopts an object-space telecentric design, two groups of glued achromatic lenses are placed in the front group, primary chromatic aberration is effectively corrected, refractive power and materials of each optical lens are reasonably matched and combined, aperture diaphragm is placed on the image side focal plane of the optical system, entrance pupil is located at infinity of the optical system, to ensure that the camera telecentric lens 10 has the same optical magnification even if the object distance is changed within the depth of field range, which provides the most accurate principle guarantee for the visual application that needs to accurately calibrate and calculate the object image proportion relationship, thereby achieving the object side telecentric function of the camera telecentric lens 10 and meeting the design requirements of high resolution, low distortion and achromatic aberration.

A dispersion coefficient of the third lens L3 is defined as v3, and a dispersion coefficient of the fourth lens L4 is defined as v4, a following relational expression is satisfied: $50.000 \leq v4 - v3 \leq 80.000$, which specifies the difference between the dispersion coefficient of the fourth lens L4 and the dispersion coefficient of the third lens L3, and within a range of the relational expression, the chromatic aberration of the system can be effectively corrected, so that the chromatic aberration $|LC| \leq 2$ μm.

A total optical length from the object-side surface of the first lens to an image plane of the camera optical lens along an optic axis of the camera telecentric lens 10 is defined as TTL, a following relational expression is satisfied: $2.000 \leq TTL/f \leq 5.000$, and within a range of the relational expression, a total length of the camera lens may be effectively controlled.

In this embodiment, the first lens L1 is made of glass, the second lens L2 is made of glass, the third lens L3 is made of glass, the fourth lens L4 is made of glass, the fifth lens L5 is made of glass, the sixth lens L6 is made of glass, the seventh lens L7 is made of glass, the eighth lens L8 is made of glass, and the ninth lens L9 is made of glass.

In this embodiment, an object-side surface of the first lens L1 is convex in the paraxial region, an image-side surface of the first lens L1 is convex in the paraxial region, and the first lens L1 has a positive refractive power. In other optional embodiments, the object-side surface and the image-side surface of the first lens L1 may also be provided with other concave and convex distributions, and the first lens L1 may also have a negative refractive power.

A focal length of the first lens L1 is f1, a following relational expression is satisfied: $0.54 \leq f1/f \leq 1.95$, through reasonable distribution of refractive powers, the system has better imaging quality and lower sensitivity.

A central curvature radius of the object-side surface of the first lens L1 is defined as R1, and a central curvature radius of the image-side surface of the first lens L1 is defined as R2, a following relational expression is satisfied: $-0.50 \leq (R1+R2)/(R1-R2) \leq 4.01$, a shape of the first lens L1 is reasonably controlled, so that the first lens can effectively correct the spherical aberration of the system.

An on-axis thickness of the first lens L1 is d1, a following relational expression is satisfied: $0.04 \leq d1/TTL \leq 0.06$, which is beneficial to controlling the thickness of the lens and the total length of the camera lens.

In this embodiment, an object-side surface of the second lens L2 is convex in the paraxial region, an image-side surface of the second lens L2 is concave in the paraxial region, and the second lens L2 has a positive refractive power. In other optional embodiments, the object-side surface and the image-side surface of the second lens L2 may also be provided with other concave and convex distributions, and the second lens L2 may also have a negative refractive power.

A focal length of the second lens L2 is f2, a following relational expression is satisfied: $-1.95 \leq f2/f \leq 1.70$, through reasonable distribution of refractive powers, the system has better imaging quality and lower sensitivity.

An on-axis thickness of the second lens L2 is d2, a following relational expression is satisfied: $0.01 \leq d3/TTL \leq 0.05$, which is beneficial to controlling the thickness of the lens and the total length of the camera lens.

In this embodiment, an object-side surface of the third lens L3 is convex in the paraxial region, an image-side surface of the third lens L3 is concave in the paraxial region, and the third lens L3 has a negative refractive power. In other optional embodiments, the object-side surface and the image-side surface of the third lens L3 may also be provided with other concave and convex distributions, and the third lens L3 may also have a positive refractive power.

A focal length of the third lens L3 is f3, a following relational expression is satisfied: $-0.44 \leq f3/f \leq 3.20$, through reasonable distribution of refractive powers, the system has better imaging quality and lower sensitivity.

A central curvature radius of the object-side surface of the third lens L3 is R5, and a central curvature radius of the image-side surface of the third lens L3 is R6, a following relational expression is satisfied: $1.44 \leq (R5+R6)/(R5-R6) \leq 8928.08$, which specifies a shape of the third lens L3, and within a specified range of the relational expression, can alleviate the deflection degree of light passing through the lens, and effectively reduce aberration.

An on-axis thickness of the third lens element L3 is d5, a following relational expression is satisfied: $0.00 \leq d5/TTL \leq 0.02$, which is beneficial to controlling the thickness of the lens and the total length of the camera lens.

In this embodiment, an object-side surface of the fourth lens L4 is convex in the paraxial region, an image-side surface of the fourth lens L4 is convex in the paraxial region, and the fourth lens L4 has a positive refractive power. In other optional embodiments, the object-side surface and the image-side surface of the fourth lens L4 may also be provided with other concave and convex distributions, and the fourth lens L4 may also have a negative refractive power.

A focal length of the fourth lens L4 is f4, a following relational expression is satisfied: $0.18 \leq f4/f \leq 0.35$, which specifies a ratio of the focal length f4 of the fourth lens L4 to a system focal length f, and helps improve the performance of the optical system within the range of the relational expression.

A central curvature radius of the object-side surface of the fourth lens L4 is R7, and a central curvature radius of the image-side surface of the fourth lens L4 is R8, a following relational expression is satisfied. $-0.35 \leq (R7+R8)/(R7-R8) \leq -0.10$, which specifies a shape of the fourth lens L4, and within a specified range of the relational expression, the deflection degree of light passing through the lens can be alleviated, thereby effectively reducing aberration.

An on-axis thickness of the fourth lens L4 is d7, a following relational expression is satisfied: $0.01 \leq d7/TTL \leq 0.05$, which is beneficial to controlling the thickness of the lens and the total length of the camera lens.

In this embodiment, an object-side surface of the fifth lens L5 is concave in the paraxial region, an image-side surface of the fifth lens L5 is concave in the paraxial region, and the fifth lens L5 has a negative refractive power. In other optional embodiments, the object-side surface and the image-side surface of the fifth lens L5 may also be provided with other concave and convex distributions, and the fifth lens L5 may also have positive refractive power.

A focal length of the fifth lens L5 is f5, a following relational expression is satisfied: $-0.25 \leq f5/f \leq -0.09$, which specifies a ratio of the focal length f5 of the fifth lens L5 to the system focal length f, and helps improve the performance of the optical system within the range of the relational expression.

A central curvature radius of the object-side surface of the fifth lens L5 is R9, and a central curvature radius of the image-side surface of the fifth lens L5 is R10, a following relational expression is satisfied: $0.12 \leq (R9+R10)/(R9-R10) \leq 0.45$, a shape of the fifth lens L5 is specified, and within a specified range of the relational expression, a deflection degree of light passing through the lens can be mitigated, thereby effectively reducing aberration.

An on-axis thickness of the fifth lens L5 is d9, a following relational expression is satisfied: $0.00 \leq d9/TTL \leq 0.03$, which is beneficial to controlling the thickness of the lens and the total length of the lens assembly.

In this embodiment, an object-side surface of the sixth lens L6 is convex in the paraxial region, an image-side surface of the sixth lens L6 is convex in the paraxial region, and the sixth lens L6 has a positive refractive power. In other optional embodiments, the object-side surface and the image-side surface of the sixth lens L6 may also be provided with other concave and convex distributions, and the sixth lens L6 may also have a negative refractive power.

A focal length of the sixth lens L6 is f6, a following relational expression is satisfied: $0.15 \leq f6/f \leq 0.29$, which specifies a ratio of the focal length f6 of the sixth lens L6 to the system focal length f, and helps improve the performance of the optical system within the range of the relational expression.

A central curvature radius of the object-side surface of the sixth lens L6 is R11, and a central curvature radius of the image-side surface of the sixth lens L6 is R12, a following relational expression is satisfied: $-1.00 \leq (R11+R12)/(R11-R12) \leq -0.33$, a shape of the sixth lens L6 is specified, and within a specified range of the relational expression, a deflection degree of light passing through the lens can be mitigated, thereby effectively reducing aberration.

An on-axis thickness of the sixth lens L6 is d11, a following relational expression is satisfied: $0.01 \leq d11/TTL \leq 0.06$, which is beneficial to controlling the thickness of the lens and the total length of the camera lens.

In this embodiment, an object-side surface of the seventh lens L7 is concave in the paraxial region, an image-side surface of the seventh lens L7 is convex in the paraxial region, and the seventh lens L7 has a positive refractive power. In other optional embodiments, the object-side surface and the image-side surface of the seventh lens L7 may also be provided with other concave and convex distributions, and the seventh lens L7 may also have a negative refractive power.

A focal length of the seventh lens L7 is f7, a following relational expression is satisfied: $0.10 \leq f7/f \leq 0.95$, which specifies a ratio of the focal length f7 of the seventh lens L7 to the focal length f of the system, and helps to improve the performance of the optical system within the range of the relational expression.

A central curvature radius of the object-side surface of the seventh lens L7 is R13, a central curvature radius of the image-side surface of the seventh lens L7 is R14, a following relational expression is satisfied: $-2.80 \leq (R13+R14)/(R13-R14) \leq 2.10$. A shape of the seventh lens L7 is specified, and within a specified range of the relational expression, a deflection degree of light passing through the lens can be alleviated, thereby effectively reducing aberration.

An on-axis thickness of the seventh lens L7 is d13, a following relational expression is satisfied: $0.00 \leq d13/TTL \leq 0.06$, which is beneficial to controlling the thickness of the lens and the total length of the camera lens.

In this embodiment, an object-side surface of the eighth lens L8 is concave in the paraxial region, an image-side surface of the eighth lens L8 is concave in the paraxial region, and the eighth lens L8 has a negative refractive power. In other optional embodiments, the object-side surface and the image-side surface of the eighth lens L8 may also be provided with other concave and convex distributions, and the eighth lens L8 may also have a positive refractive power.

A central curvature radius of the object-side surface of the eighth lens L8 is R15, a central curvature radius of the image-side surface of the seventh lens is R16, a following relational expression is satisfied: $-2.00 \leq (R15+R16)/(R15-R16) \leq 0.16$. A shape of the eighth lens L8 is specified, and within a specified range of the relational expression, a deflection degree of light passing through the lens can be alleviated, thereby effectively reducing aberration.

An on-axis thickness of the eighth lens L8 is d15, a following relational expression is satisfied: $0.00 \leq d15/TTL \leq 0.03$, which is beneficial to controlling the thickness of the lens and the total length of the camera lens.

In this embodiment, an object-side surface of the ninth lens L9 is convex in in the paraxial region, an image-side surface of the ninth lens L9 is convex in the paraxial region, and the ninth lens L9 may also have a positive refractive power. In other optional embodiments, the object-side surface and the image-side surface of the ninth lens L9 may also be provided with other concave and convex distributions, and the ninth lens L9 may also have a negative refractive power.

A focal length of the ninth lens L9 is f9, a following relational expression is satisfied: $0.64 \leq f9/f \leq 2.97$, which specifies a ratio of the focal length f9 of the ninth lens L9 to the system focal length f, and helps to improve the performance of the optical system within the range of the relational expression.

A central curvature radius of the object-side surface of the ninth lens L9 is R17, and a central curvature radius of the image-side surface of the seventh lens is R18. A shape of the ninth lens L9 is specified, and within a specified range of the relational expression, a deflection degree of light passing through the lens can be alleviated, thereby effectively reducing aberration.

An on-axis thickness of the ninth lens L9 is d17, a following relational expression is satisfied: $0.01 \leq d17/TTL \leq 0.08$, which is beneficial to controlling the thickness of the lens and the total length of the camera lens.

The camera telecentric lens 10 of the present disclosure will now be described by way of example. The symbols recited in example are shown below. The units of the focal length, the on-axis distance, the central curvature radius and the on-axis thickness are mm.

TTL: A total optical length from the object-side surface of the first lens to an image plane of the camera optical lens along an optic axis (an on-axis distance from the object-side surface of the first lens L1 to the image plane), in mm;

Optionally, the object-side surface and/or the image-side surface of the lens may be further provided with an inflection point and/or a stationary point, so as to meet high-quality imaging requirements.

Table 1 shows design data of the camera telecentric lens 10 as described in Embodiment 1 of the present disclosure.

TABLE 1

| | | R | d | | nd | | vd |
|---|---|---|---|---|---|---|---|
| OBJ | | | dOBJ(WD)= | 125.090 | | | |
| G1 | R1 | 95.290 | d1= | 15.000 | nd1 | 1.4565 | v1 | 90.27 |
| | R2 | −95.290 | d2= | 0.500 | | | |
| G2 | R3 | 75.380 | d3= | 6.450 | nd2 | 2.1042 | v2 | 17.02 |
| | R4 | 132.080 | d4= | 4.090 | | | |
| G3 | R5 | 183.720 | d5= | 1.900 | nd3 | 1.7521 | v3 | 25.05 |
| | R6 | 33.320 | d6= | 0.000 | | | |
| G4 | R7 | 33.320 | d7= | 16.500 | nd4 | 1.4586 | v4 | 90.19 |
| | R8 | −57.690 | d8= | 2.460 | | | |
| G5 | R9 | −48.320 | d9= | 2.420 | nd5 | 1.6134 | v5 | 44.11 |
| | R10 | 37.340 | d10= | 0.000 | | | |
| G6 | R11 | 37.340 | d11= | 13.000 | nd6 | 1.8830 | v6 | 40.85 |
| | R12 | −785.220 | d11-BS= | 4.130 | | | |
| BS | | | dBS= | 35.000 | | | |
| | | | dBS-S1= | 6.600 | | | |
| S1 | | | dS1-13= | 5.080 | | | |
| G7 | R13 | −132.080 | d13= | 9.400 | nd7 | 1.7234 | v7 | 37.99 |
| | R14 | −45.840 | d14= | 8.000 | | | |
| G8 | R15 | −29.540 | d15= | 6.500 | nd8 | 1.7015 | v8 | 41.15 |
| | R16 | 119.320 | d16= | 92.900 | | | |
| G9 | R17 | 183.720 | d17= | 15.000 | nd9 | 1.8810 | v9 | 40.14 |
| | R18 | −785.220 | d18= | 97.614 | | | |

The meaning of each symbol is as follows.

S1: aperture;

OBJ: object surface;

BS: beam splitting prism;

Gn: $n^{th}$ lens;

R: central curvature radius of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the eighth lens L8;

R16: central curvature radius of the image-side surface of the eighth lens L8;

R17: central curvature radius of the object-side surface of the ninth lens L9;

R18: central curvature radius of the image-side surface of the ninth lens L9;

d: on-axis thickness of the lens and an on-axis distance between the lenses;

dOBJ(WD): on-axis distance from the object plane OBJ to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d11-BS: on-axis distance from the image-side surface of the sixth lens L6 to the object-side surface of the beam splitting prism BS;

dBS: on-axis thickness of the beam splitting prism BS;

dBS-S1: on-axis distance from the image-side surface of the beam splitting prism BS to the aperture S1;

dS1-13: on-axis distance from the aperture S1 to the image-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the ninth lens L9;

d17: on-axis thickness of the ninth lens L9;

d18: on-axis distance from the image-side surface of the ninth lens L9 to the image plane Si;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: a refractive index of d line of the fifth lens L5;

In this embodiment, the entrance pupil diameter of the camera telecentric lens is 4633.628 mm, the full field of view image height is 18.5 mm, the numerical aperture is 0.13, and the camera telecentric lens has good optical performance and high magnification, which can meet precision detection of a machine vision system.

Embodiment 2

Embodiment 2 is substantially the same as Embodiment I, and the symbols have the same meaning as Embodiment 1, and only differences are listed below.

Table 2 shows design data of a camera telecentric lens 20 as described in Embodiment 2 of the present disclosure.

TABLE 2

|  |  | R | d |  | nd |  | vd |  |
|---|---|---|---|---|---|---|---|---|
| OBJ |  |  | dOBJ(WD)= | 120.511 |  |  |  |  |
| G1 | R1 | 95.901 | d1= | 15.000 | nd1 | 1.4565 | v1 | 90.27 |
|  | R2 | −132.307 | d2= | 3.139 |  |  |  |  |
| G2 | R3 | 231.002 | d3= | 3.601 | nd2 | 2.1042 | v2 | 17.02 |
|  | R4 | 923.526 | d4= | 7.737 |  |  |  |  |
| G3 | R5 | 126.269 | d5= | 2.068 | nd3 | 1.6889 | v3 | 31.18 |
|  | R6 | 31.014 | d6= | 0.000 |  |  |  |  |
| G4 | R7 | 31.014 | d7= | 11.587 | nd4 | 1.4970 | v4 | 81.61 |
|  | R8 | −59.477 | d8= | 3.045 |  |  |  |  |
| G5 | R9 | −50.704 | d9= | 7.000 | nd5 | 1.6134 | v5 | 44.11 |
|  | R10 | 34.322 | d10= | 0.000 |  |  |  |  |
| G6 | R11 | 34.322 | d11= | 14.735 | nd6 | 1.8830 | v6 | 40.85 |
|  | R12 | −1070.543 | d11-BS= | 3.484 |  |  |  |  |
| BS |  |  | dBS= | 35.000 |  |  |  |  |
|  |  |  | dBS-S1= | 9.511 |  |  |  |  |
| S1 |  |  | dS1-13= | 5.928 |  |  |  |  |
| G7 | R13 | −5738.608 | d13= | 12.430 | nd7 | 1.7234 | v7 | 37.99 |
|  | R14 | −99.061 | d14= | 10.270 |  |  |  |  |
| G8 | R15 | −33.817 | d15= | 9.600 | nd8 | 1.7015 | v8 | 41.15 |
|  | R16 | 97.139 | d16= | 97.859 |  |  |  |  |
| G9 | R17 | 140.002 | d17= | 14.999 | nd9 | 1.8088 | v9 | 40.97 |
|  | R18 | −763.703 | d18= | 71.079 |  |  |  |  | nd6: refractive index of d line of the sixth lens L6;

nd7: refractive index of d line of the seventh lens L7;

nd8: refractive index of d line of the eighth lens L8;

nd9: refractive index of d line of the ninth lens L9;

vd: abbe number;

V1: abbe number of the first lens L1;

V2: abbe number of the second lens L2;

V3: abbe number of the third lens L3;

V4: abbe number of the fourth lens L4;

V5: abbe number of the fifth lens L5;

V6: abbe number of the sixth lens L6;

V7: abbe number of the seventh lens L7;

V8: abbe number of the eighth lens L8;

V9: abbe number of the ninth lens L9.

Figure 2:
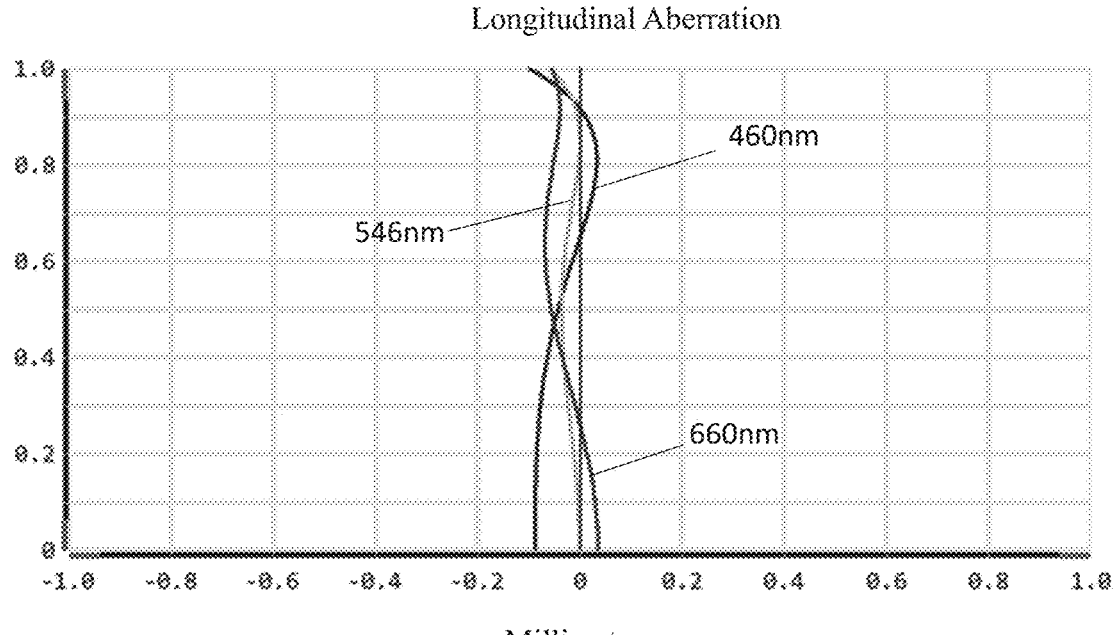
FIG. 2 is a schematic diagram of longitudinal aberration of the camera telecentric lens shown in FIG. 1.
Figure 3:
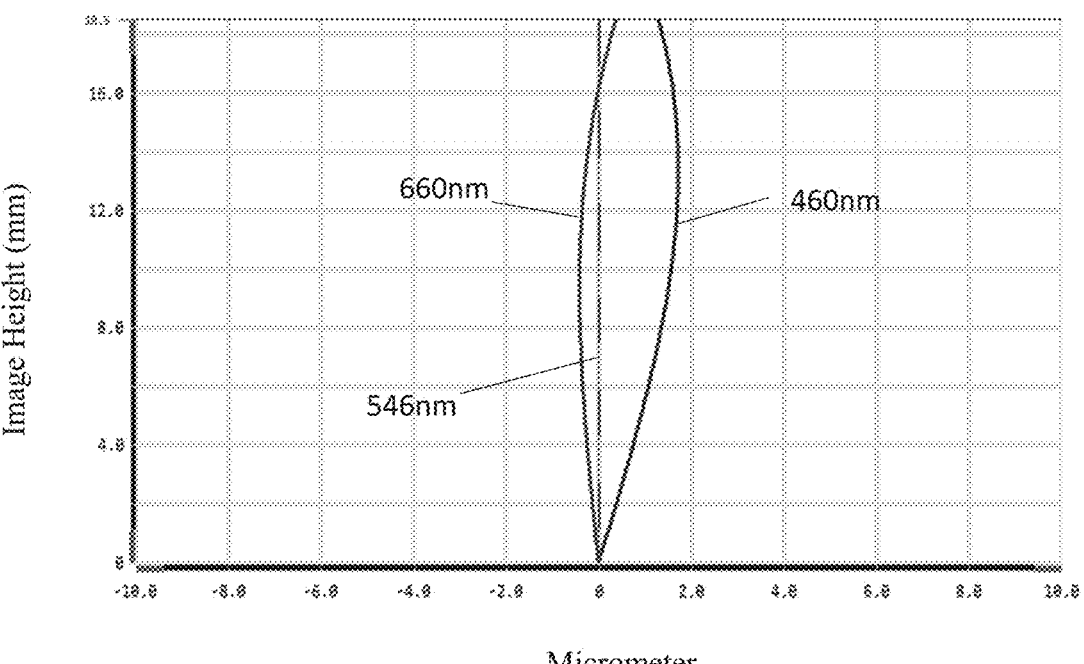
FIG. 3 is a schematic diagram of lateral color of the camera telecentric lens shown in FIG. 1.
Figure 4:
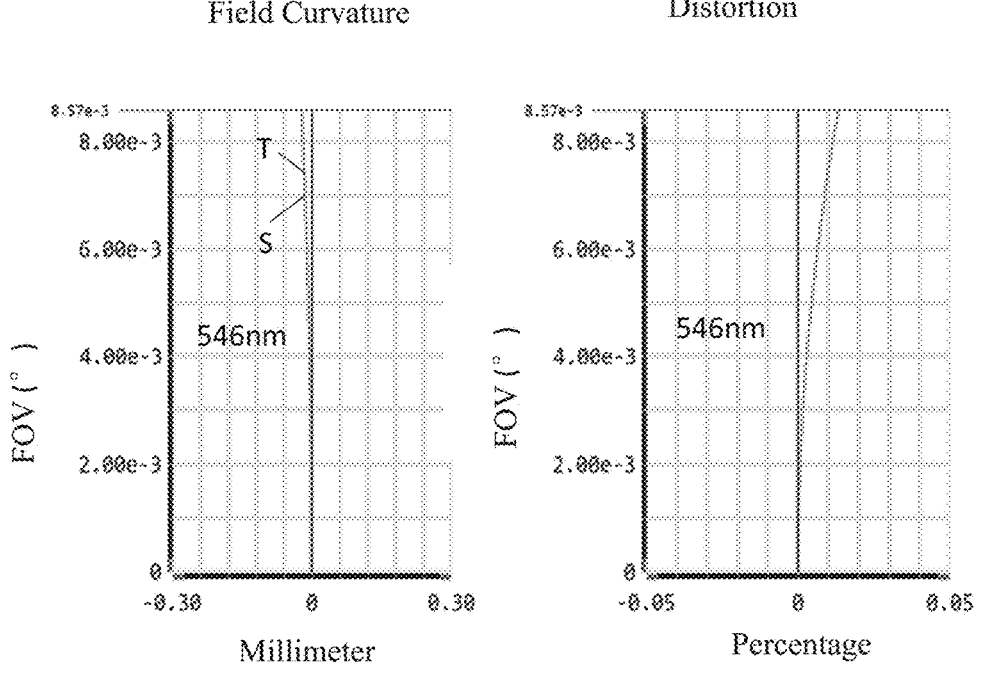
FIG. 4 is a schematic diagram of field curvature and distortion of the camera telecentric lens shown in FIG. 1.
Figure 5:
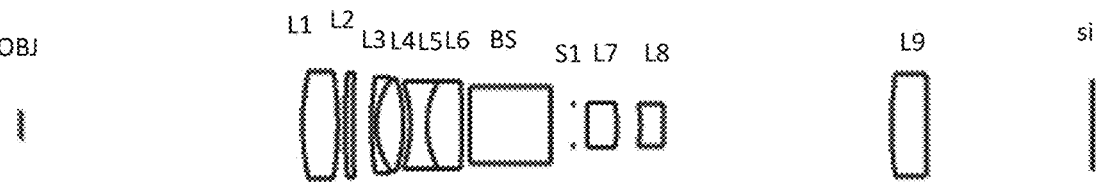
FIG. 5 is a structural schematic diagram of the telecentric lens as described in Embodiment 2 of the present disclosure.

FIG. 2 and FIG. 3 respectively show a longitudinal aberration and a lateral color of light with wavelengths 660 nm, 546 nm and 460 nm after passing through the camera telecentric lens 10 as described in Embodiment 1. FIG. 4 shows field curvature and distortion of light with wavelength 546 nm after passing through the camera telecentric lens 10 as described in Embodiment 1, the field curvature S in FIG. 4 is the field curvature in a sagittal direction, and T is the field curvature in a meridional direction.

Table 8 below shows values corresponding to various values in example 1, example 2, example 3, example 4, example 5, example 6, example 7, and the parameters specified in the relational expression.

As shown in Table 8, Embodiment 1 satisfies each relational expression.

Figure 6:
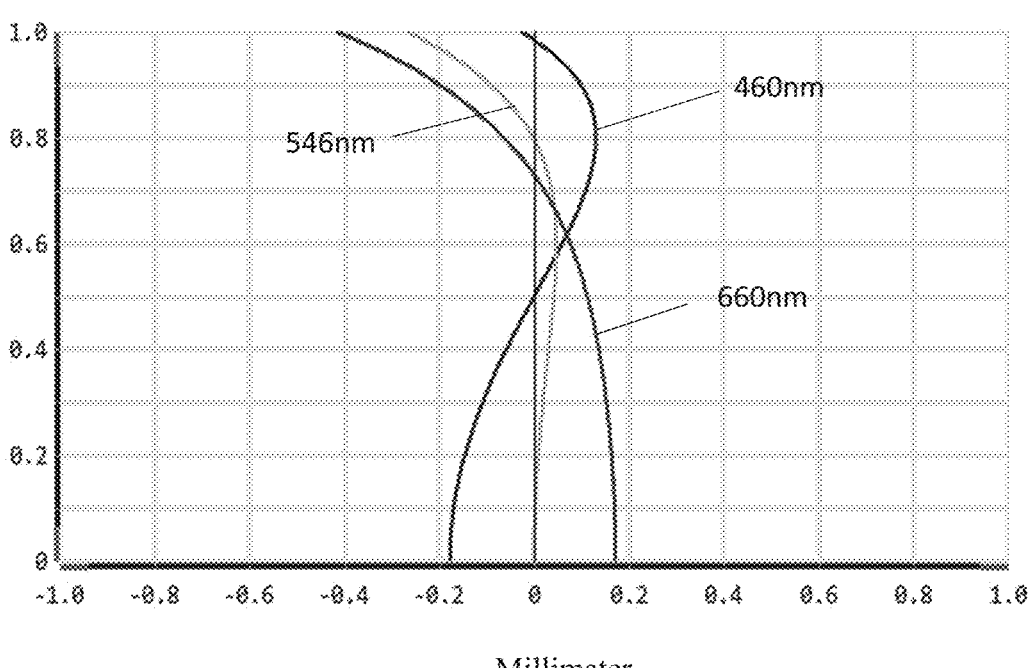
FIG. 6 is a schematic diagram of longitudinal aberration of the camera telecentric lens shown in FIG. 5.
Figure 7:
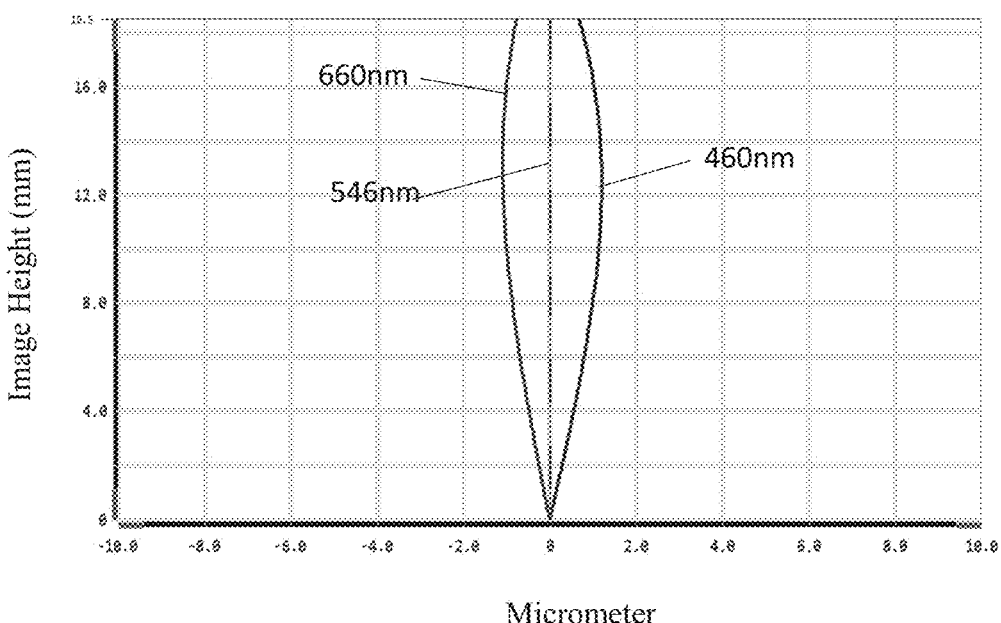
FIG. 7 is a schematic diagram of lateral color of the camera telecentric lens shown in FIG. 5.
Figure 8:
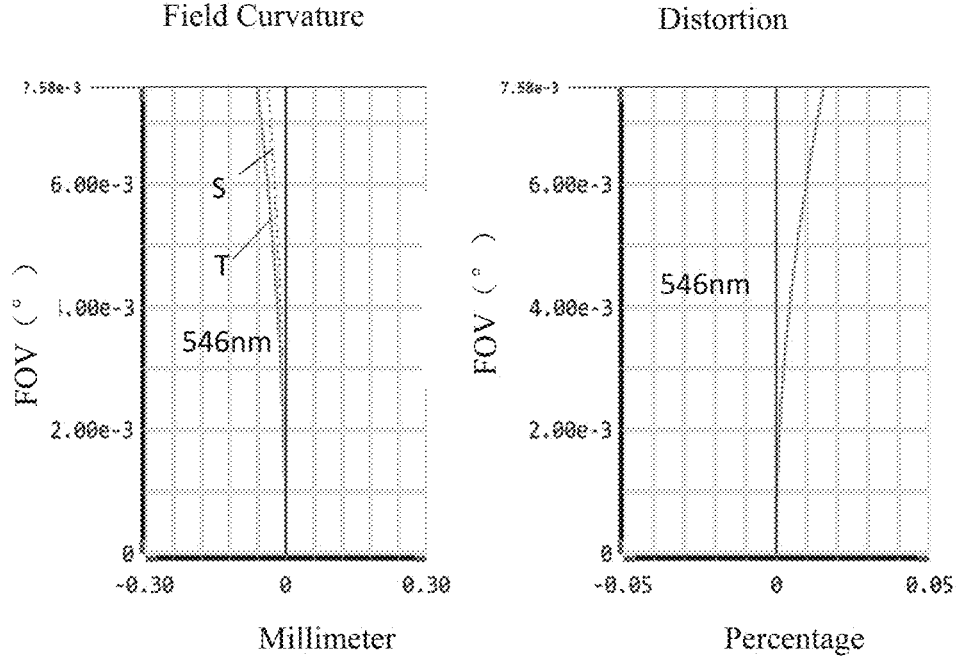
FIG. 8 is a schematic diagram of field curvature and distortion of the camera telecentric lens shown in FIG. 5.
Figure 9:
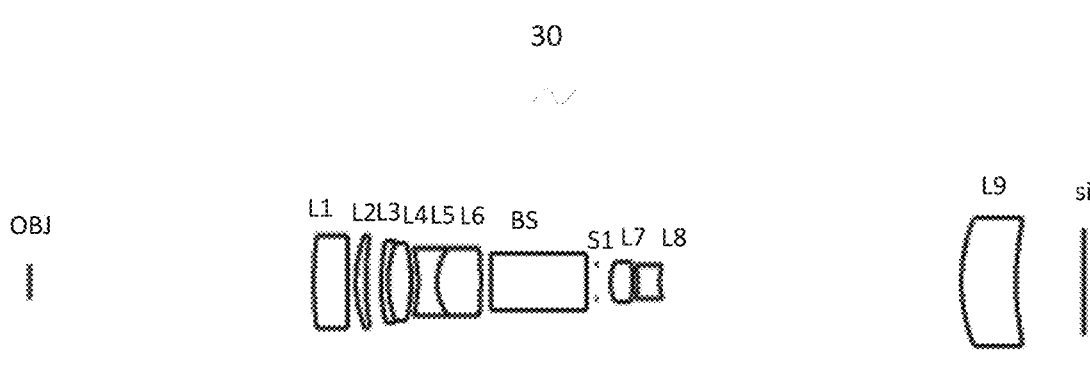
FIG. 9 is a structural schematic diagram of the camera telecentric lens as described in Embodiment 3 of the present disclosure.

FIG. 6 and FIG. 7 respectively show longitudinal aberration and lateral color of light with wavelengths 660 nm, 546 nm and 460 nm after passing through the telecentric lens 20 as described in Embodiment 2. FIG. 8 shows field curvature and distortion of light with a wavelength of 546 nm after passing through the camera telecentric lens 20 as described in Embodiment 2, where the field curvature S in FIG. 8 is a field curvature in a sagittal direction, and T is a field curvature in a meridional direction.

Table 8 below shows values corresponding to various values in example 1, example 2, example 3, example 4, example 5, example 6, example 7, and the parameters specified in the relational expression.

As shown in Table 8, Embodiment 2 satisfies each relational expression.

In this embodiment, an entrance pupil diameter of the telecentric lens is 5000.248 mm, a full field of view image height is 18.5 mm, and a field of view in a diagonal direction is 0.01°, which has good optical performance.

Embodiment 3

Embodiment 3 is substantially the same as Embodiment 1, and the symbols have the same meaning as Embodiment 1, and only differences are listed below.

In this embodiment, an object-side surface of the seventh lens L7 is convex in the paraxial region, and an image-side surface of the ninth lens L9 is concave in the paraxial region.

Table 3 shows design data of a camera telecentric lens 30 as described in Embodiment 3 of the present disclosure.

TABLE 3

| | | R | d | | | nd | | vd |
|---|---|---|---|---|---|---|---|---|
| OBJ | | | dOBJ(WD)= | 104.376 | | | | |
| G1 | R1 | 127.848 | d1= | 12.516 | nd1 | 1.5111 | v1 | 60.48 |
| | R2 | −377.189 | d2= | 2.864 | | | | |
| G2 | R3 | 41.519 | d3= | 3.721 | nd2 | 2.1042 | v2 | 17.02 |
| | R4 | 89.197 | d4= | 5.575 | | | | |
| G3 | R5 | 64.700 | d5= | 2.542 | nd3 | 2.1042 | v3 | 17.02 |
| | R6 | 34.974 | d6= | 0.000 | | | | |
| G4 | R7 | 34.974 | d7= | 8.513 | nd4 | 1.4378 | v4 | 94.52 |
| | R8 | −49.233 | d8= | 2.454 | | | | |
| G5 | R9 | −44.467 | d9= | 7.000 | nd5 | 1.6889 | v5 | 31.19 |
| | R10 | 18.977 | d10= | 0.000 | | | | |
| G6 | R11 | 18.977 | d11= | 16.000 | nd6 | 1.5796 | v6 | 53.71 |
| | R12 | −125.141 | d11-BS= | 3.802 | | | | |
| BS | | | dBS= | 35.000 | | | | |
| | | | dBS-S1= | 3.609 | | | | |
| S1 | | | dS1-13= | 5.303 | | | | |
| G7 | R13 | 15.687 | d13= | 8.116 | nd7 | 1.5750 | v7 | 41.51 |
| | R14 | −34.044 | d14= | 1.835 | | | | |
| G8 | R15 | −23.472 | d15= | 8.008 | nd8 | 1.8830 | v8 | 40.85 |
| | R16 | 17.293 | d16= | 110.805 | | | | |
| G9 | R17 | 56.766 | d17= | 20.000 | nd9 | 1.8467 | v9 | 23.78 |
| | R18 | 95.093 | d18= | 24.954 | | | | |

Figure 10:
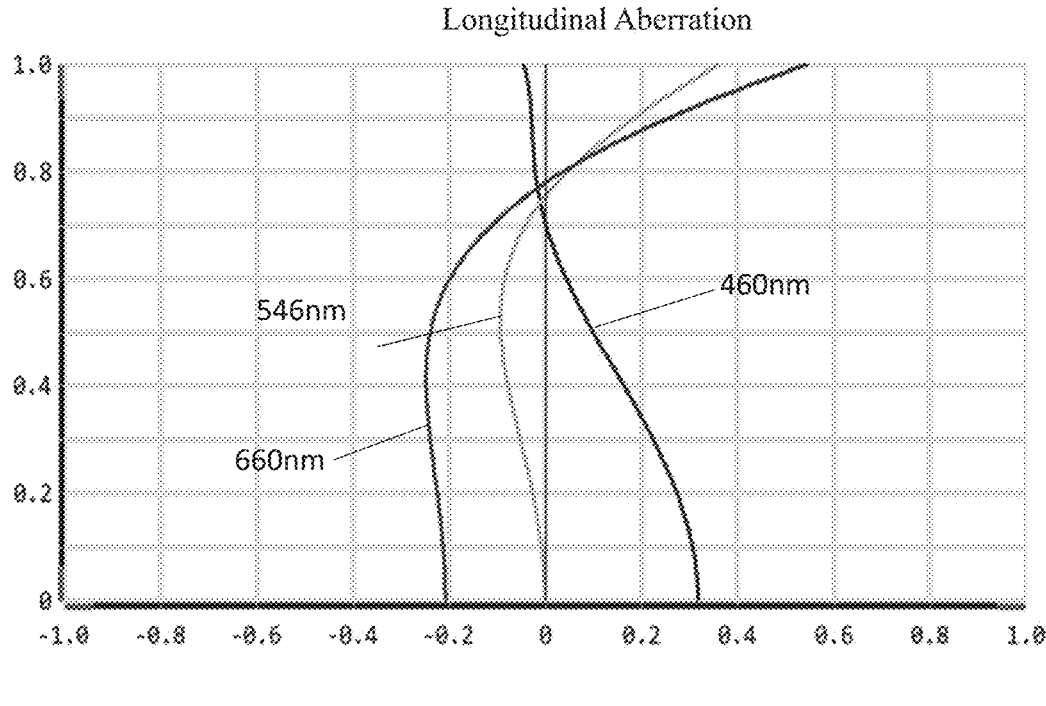
FIG. 10 is a schematic diagram of the longitudinal aberration of the camera telecentric lens shown in FIG. 9.
Figure 11:
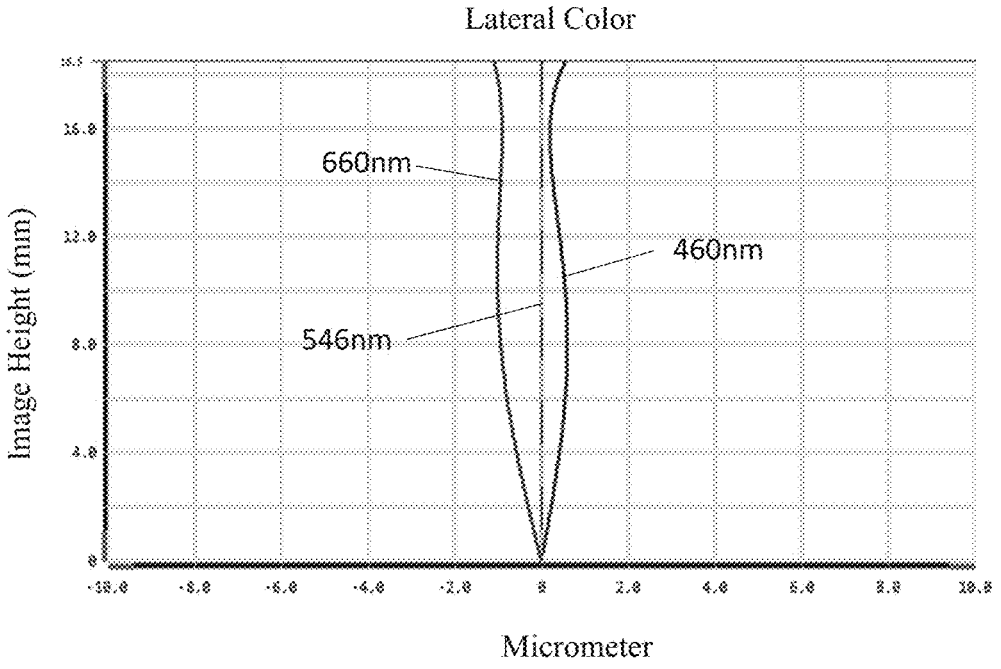
FIG. 11 is a schematic diagram of lateral color of the camera telecentric lens shown in FIG. 9.
Figure 12:
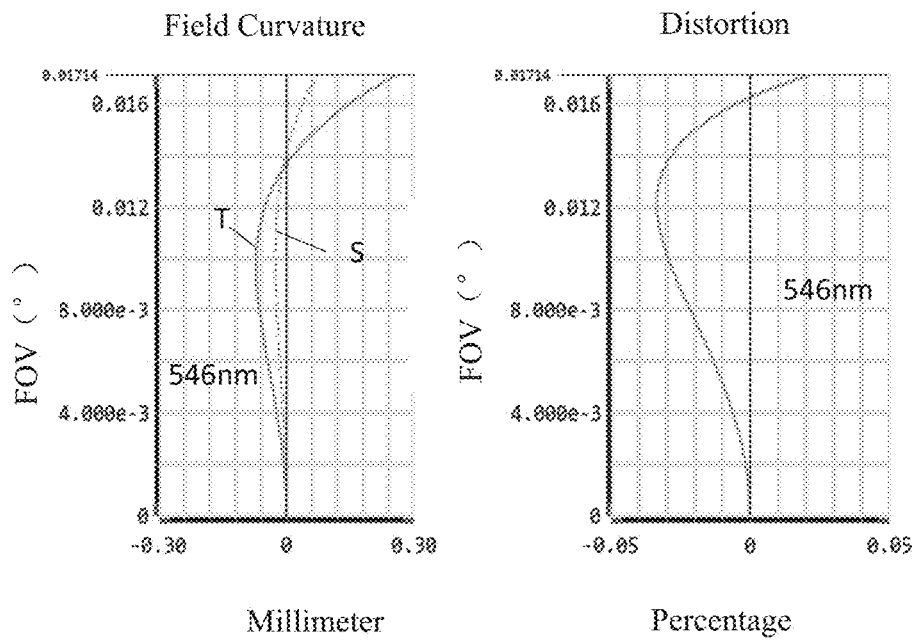
FIG. 12 is a schematic diagram of field curvature and distortion of the camera telecentric lens shown in FIG. 9.
Figure 13:
FIG. 13 is a structural schematic diagram of the camera telecentric lens described in Embodiment 4 of the present disclosure.
Figure 13:
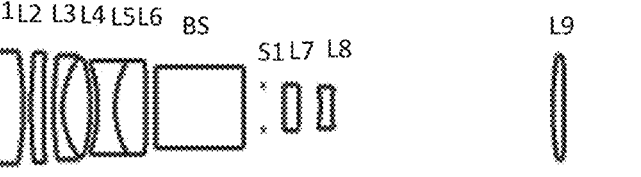

FIG. 10 and FIG. 11 respectively show longitudinal aberration and lateral color of light with wavelengths 660 nm, 54 6 nm and 460 nm after passing through the camera telecentric lens 30 as described in embodiment 3. FIG. 12 shows field curvature and distortion of light with a wavelength of 546 nm after passing through the telecentric lens 30 according to Embodiment 3, the field curvature S in FIG. 12 is field curvature in a sagittal direction, and T is a field curvature in a meridional direction.

Table 8 below shows values corresponding to various values in example 1, example 2, example 3, example 4, example 5, example 6, example 7, and the parameters specified in the relational expression.

As shown in Table 8, Embodiment 3 satisfies each relational expression:

In this embodiment, an entrance pupil diameter of the camera telecentric lens is 3592.504 mm, a full field of view image height is 18.5 mm, and a field of view in a diagonal direction is 0.03°, which has good optical performance.

Embodiment 4

Embodiment 4 is substantially the same as Embodiment 1, and the symbols have the same meaning as Embodiment 1, and only differences are listed below.

In this embodiment, an object-side surface of the seventh lens L7 is convex in the paraxial region.

Table 4 shows design data of a camera telecentric lens 40 as described in Embodiment 4 of the present disclosure.

TABLE 4

| | | R | d | | | nd | | vd |
|---|---|---|---|---|---|---|---|---|
| OBJ | | | dOBJ(WD)= | 113.109 | | | | |
| G1 | R1 | 106.753 | d1= | 12.703 | nd1 | 1.4565 | v1 | 90.27 |
| | R2 | −111.021 | d2= | 3.200 | | | | |
| G2 | R3 | 208.698 | d3= | 5.000 | nd2 | 2.2900 | v2 | 21.18 |
| | R4 | 649.751 | d4= | 3.918 | | | | |
| G3 | R5 | 125.285 | d5= | 3.703 | nd3 | 1.6889 | v3 | 31.19 |
| | R6 | 31.248 | d6= | 0.000 | | | | |
| G4 | R7 | 31.248 | d7= | 11.083 | nd4 | 1.4970 | v4 | 81.61 |
| | R8 | −60.887 | d8= | 2.835 | | | | |
| G5 | R9 | −51.760 | d9= | 6.994 | nd5 | 1.6134 | v5 | 44.11 |
| | R10 | 34.455 | d10= | 0.000 | | | | |
| G6 | R11 | 34.455 | d11= | 12.118 | nd6 | 1.8830 | v6 | 40.85 |
| | R12 | −869.086 | d11-BS= | 4.106 | | | | |
| BS | | | dBS= | 35.000 | | | | |
| | | | dBS-S1= | 7.979 | | | | |
| S1 | | | dS1-13= | 8.266 | | | | |
| G7 | R13 | 2147.438 | d13= | 6.141 | nd7 | 1.7234 | v7 | 37.99 |
| | R14 | −87.096 | d14= | 8.403 | | | | |
| G8 | R15 | −34.405 | d15= | 4.786 | nd8 | 1.7015 | v8 | 41.15 |
| | R16 | 65.666 | d16= | 88.174 | | | | |
| G9 | R17 | 123.055 | d17= | 4.201 | nd9 | 1.8088 | v9 | 40.97 |
| | R18 | −5391.036 | d18= | 76.514 | | | | |

Figure 14:
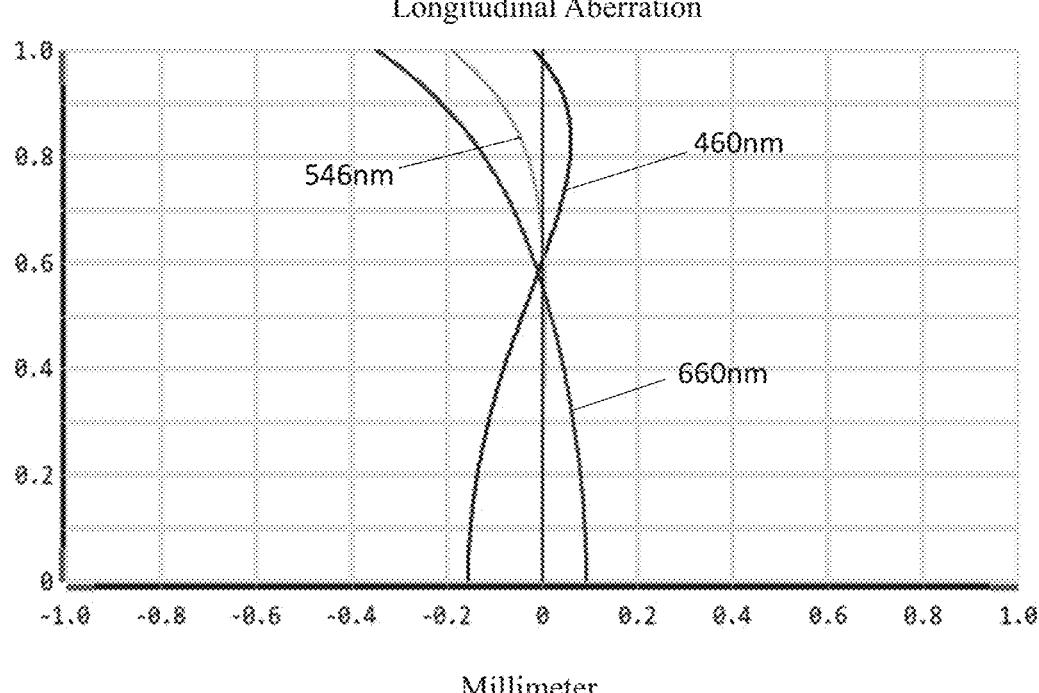
FIG. 14 is a structural schematic diagram of longitudinal aberration of the telecentric lens shown in FIG. 13.
Figure 15:
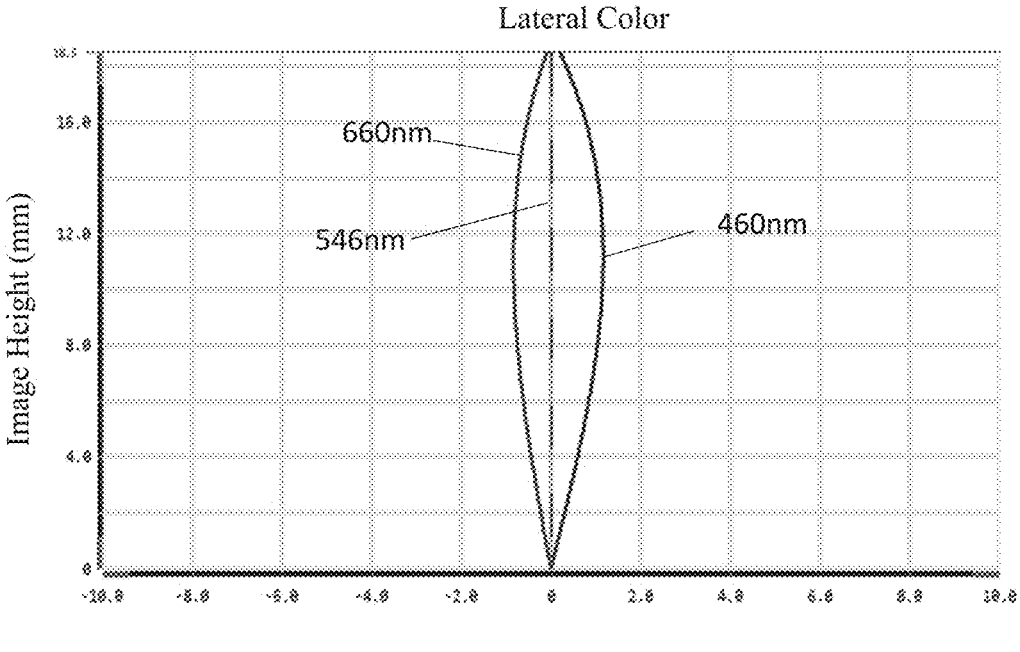
FIG. 15 is a schematic diagram of lateral color of the camera telecentric lens shown in FIG. 13.
Figure 16:
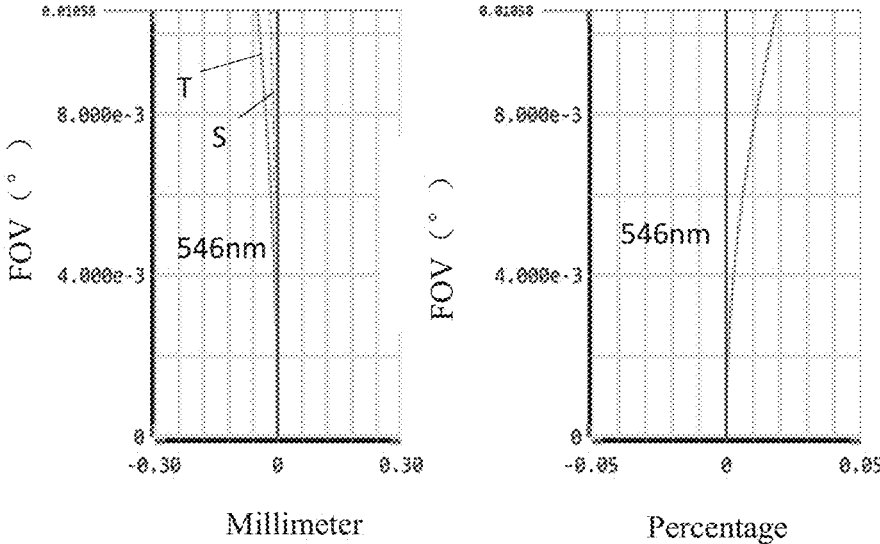
FIG. 16 is a schematic diagram of field curvature and distortion of the camera telecentric lens shown in FIG. 13.
Figure 17:
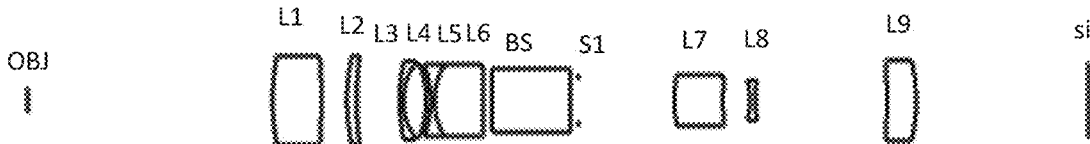
FIG. 17 is a structural schematic diagram of the camera telecentric lens as described in Embodiment 5 of the present disclosure.

FIG. 14 and FIG. 15 respectively show longitudinal aberration and lateral color of light with wavelengths 660 nm, 546 nm and 460 nm after passing through a camera telecentric lens 40 as described in Embodiment 4. FIG. 16 shows field curvature and distortion of light with a wavelength of 546 nm after passing through the camera telecentric lens 40 as described in Embodiment 4, the field curvature S in FIG. 16 is field curvature in a sagittal direction, and T is field curvature in a meridional direction.

Table 8 below shows values corresponding to various values in example 1, example 2, example 3, example 4, example 5, example 6, example 7, and the parameters specified in the relational expression.

As shown in Table 8, Embodiment 4 satisfies each relational expression.

In this embodiment, an entrance pupil diameter of the camera telecentric lens is 3820.700 mm, a full field of view image height is 18.5 mm, and a field of view in a diagonal direction is 0.02°, which has good optical performance.

Embodiment 5

Embodiment 5 is substantially the same as Embodiment 1, and the symbols have the same meaning as Embodiment 1, and only differences are listed below.

In this embodiment, an object-side surface of the seventh lens L7 is convex in the paraxial region, an image-side surface of the seventh lens L7 is concave in the paraxial region, and an object-side surface of the ninth lens L9 is concave in the paraxial region.

Figure 20:
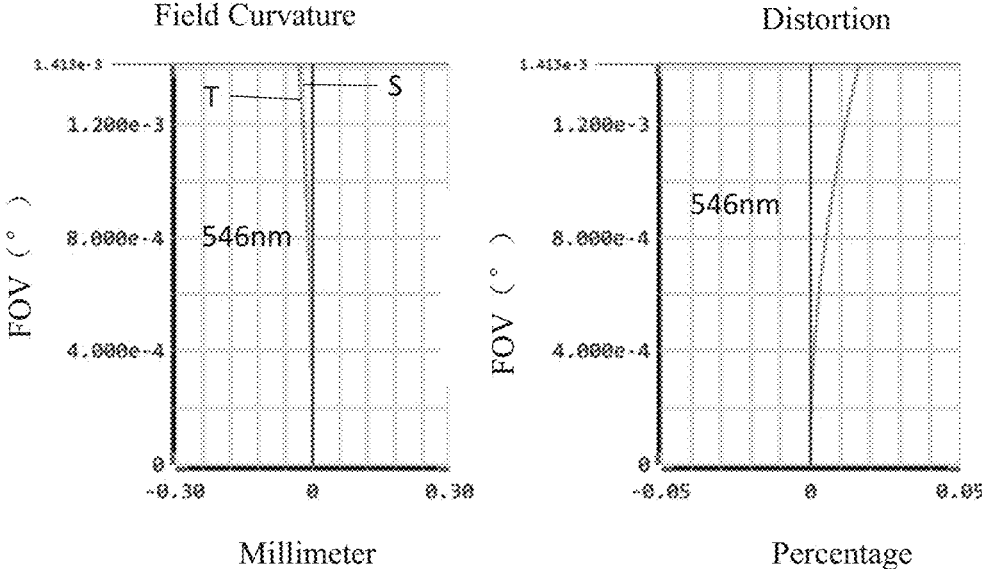
FIG. 20 is a schematic diagram of field curvature and distortion of the camera telecentric lens shown in FIG. 17.
Figure 21:
FIG. 21 is a structural schematic diagram of the camera telecentric lens as described in the Embodiment 6 of the present disclosure.

Table 5 shows design data of a camera telecentric lens 50 as described in Embodiment 5 of the present disclosure.

length of 546 nm after passing through the camera telecentric lens 50 as described in Embodiment 5, the field curvature S in FIG. 20 is field curvature in a sagittal direction, and T is field curvature in a meridional direction.

Table 8 below shows values corresponding to various values in example 1, example 2, example 3, example 4, example 5, example 6, example 7, and the parameters specified in the relational expression.

As shown in Table 8, Embodiment 5 satisfies each relational expression.

In this embodiment, an entrance pupil diameter of the camera telecentric lens is 25971.381 mm, a full field of view image height is 18.5 mm, and a field of view in a diagonal direction is 0.00°, which has good optical performance.

Embodiment 6

Embodiment 6 is substantially the same as Embodiment 1, and the symbols have the same meaning as Embodiment 1, and only differences are listed below.

In this embodiment, an object-side surface of the first lens L1 is concave in the paraxial region, an image-side surface of the eighth lens L8 is convex in the paraxial region, an object-side surface of the ninth lens L9 is concave in the

TABLE 5

|     |     | R | d |  | nd |  | vd |  |
|-----|-----|------|------|------|------|-----|-------|
| OBJ |     |          | dOBJ(WD)= | 125.800 |       |    |       |
| G1  | R1  | 107.579  | d1=       | 25.000  | nd1   | v1 | 90.27 |
|     | R2  | −303.748 | d2=       | 13.155  |       |    |       |
| G2  | R3  | 92.722   | d3=       | 4.910   | nd2   | v2 | 25.43 |
|     | R4  | 137.913  | d4=       | 22.140  |       |    |       |
| G3  | R5  | 89.098   | d5=       | 1.900   | nd3   | v3 | 31.18 |
|     | R6  | 29.588   | d6=       | 0.000   |       |    |       |
| G4  | R7  | 29.588   | d7=       | 11.678  | nd4   | v4 | 94.52 |
|     | R8  | −48.658  | d8=       | 2.275   |       |    |       |
| G5  | R9  | −48.080  | d9=       | 2.000   | nd5   | v5 | 44.11 |
|     | R10 | 31.824   | d10=      | 0.000   |       |    |       |
| G6  | R11 | 31.824   | d11=      | 24.999  | nd6   | v6 | 34.97 |
|     | R12 | −1779.217| d11-BS=   | 4.550   |       |    |       |
| BS  |     |          | dBS=      | 40.000  |       |    |       |
|     |     |          | dBS-S1=   | 4.416   |       |    |       |
| S1  |     |          | dS1-13=   | 49.173  |       |    |       |
| G7  | R13 | 60.825   | d13=      | 25.000  | nd7   | v7 | 39.54 |
|     | R14 | 129.079  | d14=      | 13.756  |       |    |       |
| G8  | R15 | −38.759  | d15=      | 2.987   | nd8   | v8 | 40.89 |
|     | R16 | 84.578   | d16=      | 67.379  |       |    |       |
| G9  | R17 | −264.872 | d17=      | 15.000  | nd9   | v9 | 40.95 |
|     | R18 | −85.506  | d18=      | 88.675  |       |    |       |

(where nd1 = 1.4565, nd2 = 2.0007, nd3 = 1.6873, nd4 = 1.4378, nd5 = 1.6134, nd6 = 1.8010, nd7 = 1.6541, nd8 = 1.5814, nd9 = 1.8061)

Figure 18:
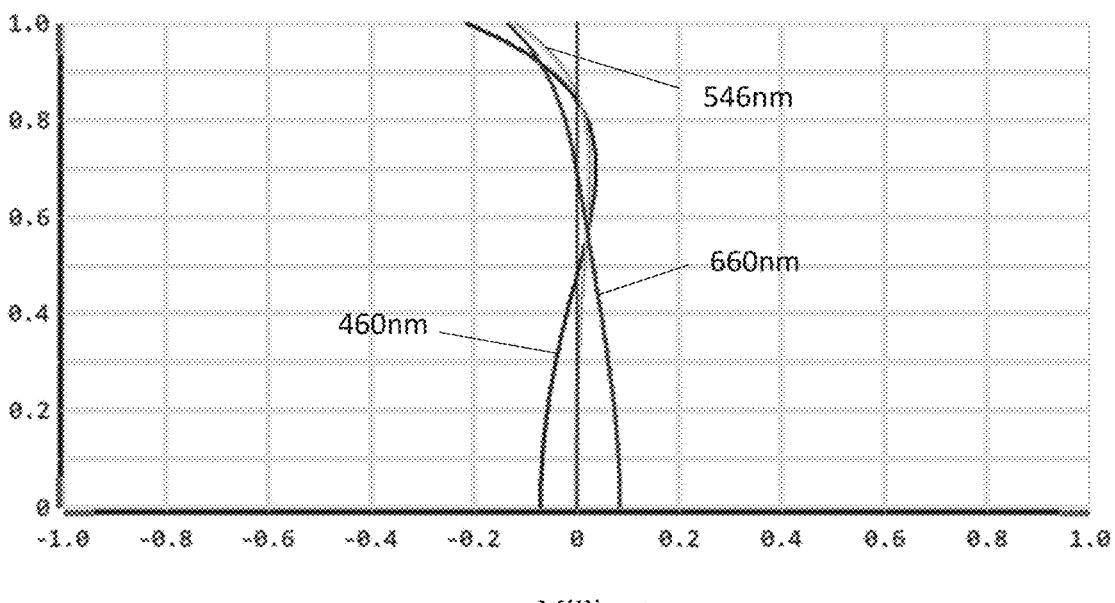
FIG. 18 is a schematic diagram of longitudinal aberration of the camera telecentric lens shown in FIG. 17.
Figure 19:
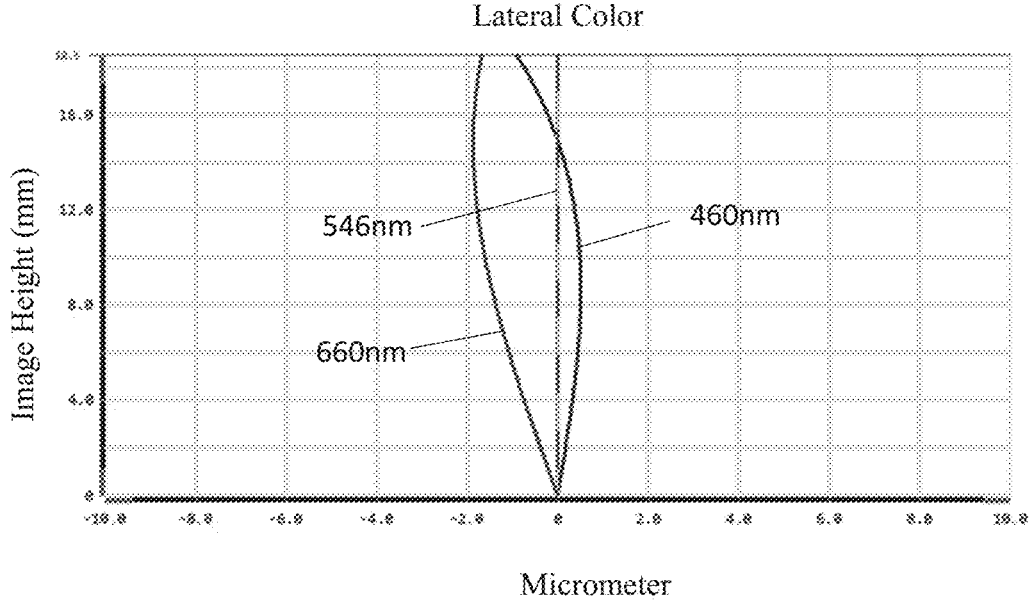
FIG. 19 is a schematic diagram of lateral color of the camera telecentric lens shown in FIG. 17.

FIG. 18 and FIG. 19 respectively show longitudinal aberration and lateral color of light with wavelengths of 660 nm, 546 nm and 460 nm after passing through the camera telecentric lens 50 as described in Embodiment 5. FIG. 20 shows field curvature and distortion of light with a waveparaxial region, a second lens L2 has a negative refractive power, and a third lens L3 has a positive refractive power.

Table 6 shows design data of a camera telecentric lens 60 as described in Embodiment 6 of the present disclosure.

TABLE 6

|     |     | R | d |  | nd |  | vd |  |
|-----|-----|---------|-----------|---------|------|-----|-------|
| OBJ |     |         | dOBJ(WD)= | 42.231  |      |     |       |
| G1  | R1  | −80.384 | d1=       | 19.944  | nd1  | v1  | 63.37 |
|     | R2  | −48.270 | d2=       | 9.754   |      |     |       |
| G2  | R3  | 36.885  | d3=       | 20.000  | nd2  | v2  | 17.02 |
|     | R4  | 22.192  | d4=       | 29.194  |      |     |       |
| G3  | R5  | 30.259  | d5=       | 5.325   | nd3  | v3  | 17.02 |
|     | R6  | 30.252  | d6=       | 0.000   |      |     |       |
| G4  | R7  | 30.252  | d7=       | 7.248   | nd4  | v4  | 68.28 |
|     | R8  | −37.219 | d8=       | 1.494   |      |     |       |

(where nd1 = 1.5525, nd2 = 2.1042, nd3 = 2.1042, nd4 = 1.5922)

TABLE 6-continued

|     |     | R | d |  | nd |  | vd |  |
|-----|-----|------|------|------|------|------|------|------|
| G5 | R9 | −34.234 | d9= | 2.000 | nd5 | 1.8554 | v5 | 36.60 |
|    | R10 | 21.803 | d10= | 0.000 |  |  |  |  |
| G6 | R11 | 21.803 | d11= | 7.276 | nd6 | 1.5891 | v6 | 61.15 |
|    | R12 | −43.557 | d11-BS= | 5.716 |  |  |  |  |
| BS |  |  | dBS= | 38.055 |  |  |  |  |
|    |  |  | dBS-S1= | 6.297 |  |  |  |  |
| S1 |  |  | dS1-13= | 16.548 |  |  |  |  |
| G7 | R13 | −7770.872 | d13= | 3.015 | nd7 | 1.7847 | v7 | 25.72 |
|    | R14 | −55.105 | d14= | 22.061 |  |  |  |  |
| G8 | R15 | −23.228 | d15= | 7.823 | nd8 | 1.6727 | v8 | 32.18 |
|    | R16 | −70.012 | d16= | 2.660 |  |  |  |  |
| G9 | R17 | −26.907 | d17= | 15.000 | nd9 | 1.6595 | v9 | 57.35 |
|    | R18 | −28.642 | d18= | 200.645 |  |  |  |  |

Figure 22:
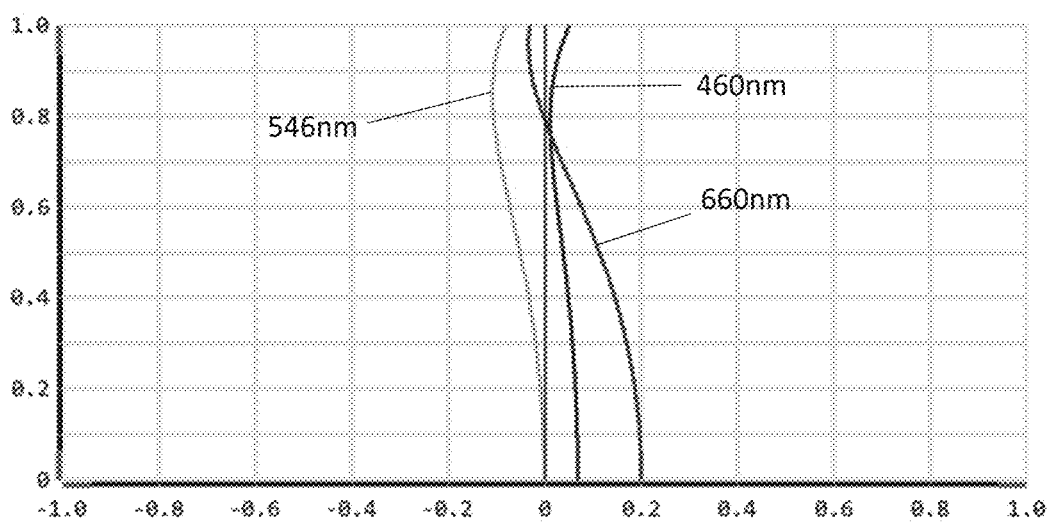
FIG. 22 is a schematic diagram of longitudinal aberration of the telecentric lens shown in FIG. 21.
Figure 23:
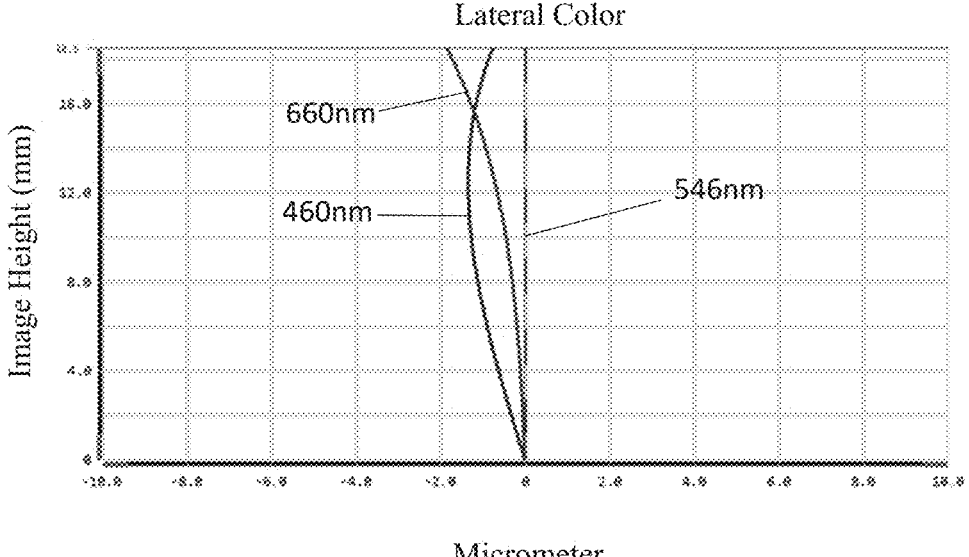
FIG. 23 is a schematic diagram of lateral color of the camera telecentric lens shown in FIG. 21.
Figure 24:
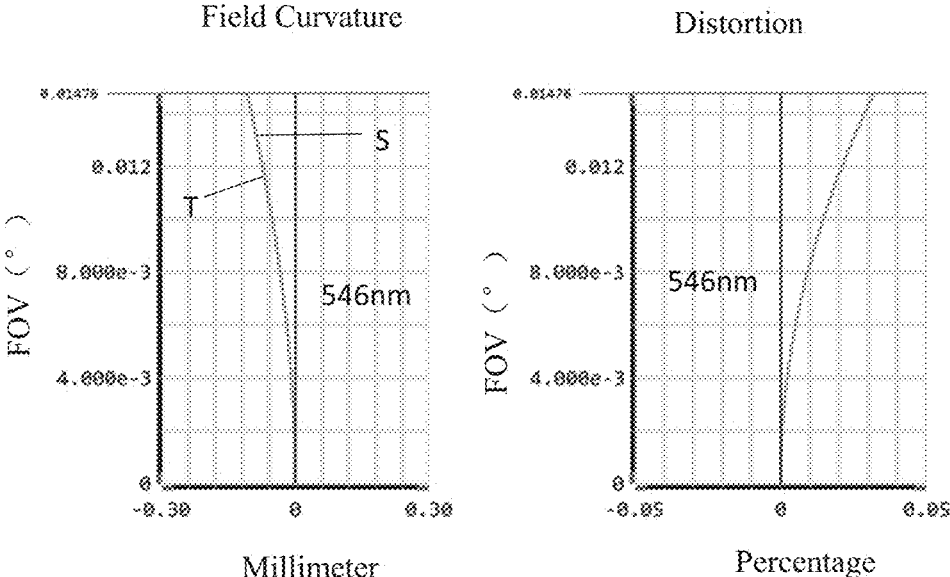
FIG. 24 is a schematic diagram of field curvature and distortion of the camera telecentric lens shown in FIG. 21.
Figure 25:
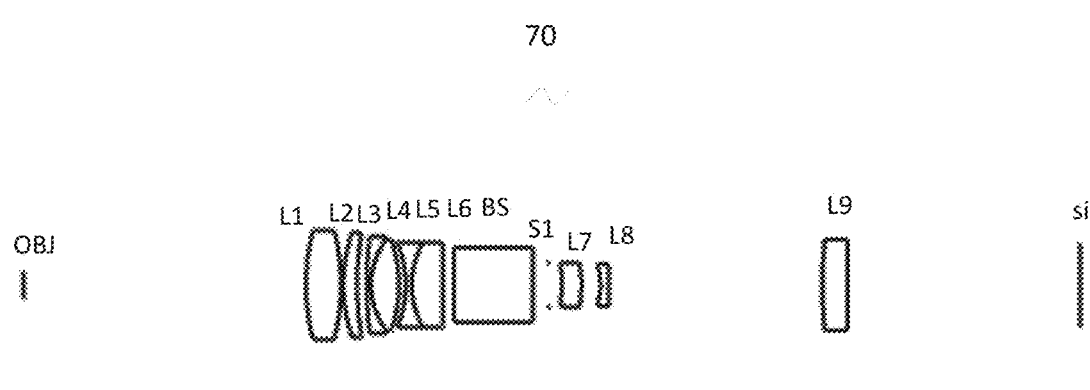
FIG. 25 is a structural schematic diagram of the telecentric lens as described in the Embodiment 7 of the present disclosure.

FIG. 22 and FIG. 23 respectively show longitudinal aberration and lateral color of light with wavelengths 660 nm, 546 nm and 460 nm after passing through a camera telecentric lens 30 as described in Embodiment 6. FIG. 24 shows field curvature and distortion of light with a wavelength of 546 nm after passing through the camera telecen-

Embodiment 7

Embodiment 7 is substantially the same as Embodiment 1, and the symbols have the same meaning as Embodiment 1, and only differences are listed below.

Table 7 shows design data of a camera telecentric lens 70 as described in Embodiment 7 of the present disclosure.

TABLE 7

|     |     | R | d |  | nd |  | vd |  |
|-----|-----|------|------|------|------|------|------|------|
| OBJ |  |  | dOBJ(WD)= | 125.090 |  |  |  |  |
| G1 | R1 | 94.560 | d1= | 15.500 | nd1 | 1.4586 | v1 | 90.20 |
|    | R2 | −94.560 | d2= | 1.050 |  |  |  |  |
| G2 | R3 | 70.600 | d3= | 5.980 | nd2 | 1.9861 | v2 | 16.48 |
|    | R4 | 124.530 | d4= | 4.380 |  |  |  |  |
| G3 | R5 | 177.000 | d5= | 1.900 | nd3 | 1.7521 | v3 | 25.05 |
|    | R6 | 32.940 | d6= | 0.000 |  |  |  |  |
|    |  |  | $d_{6\text{-}BS}$= | 4.550 |  |  |  |  |
|    |  |  | $d_{BS}$= | 35.000 |  |  |  |  |
|    |  |  | $d_{BS\text{-}s1}$= | 7.220 |  |  |  |  |
|    |  |  | $d_{s1\text{-}7}$= | 5.600 |  |  |  |  |
| G4 | R7 | 32.940 | d7= | 12.340 | nd4 | 1.4586 | v4 | 90.20 |
|    | R8 | −57.740 | d8= | 2.980 |  |  |  |  |
| G5 | R9 | −47.550 | d9= | 2.630 | nd5 | 1.6140 | v5 | 44.29 |
|    | R10 | 36.730 | d10= | 0.000 |  |  |  |  |
| G6 | R11 | 36.730 | d11= | 13.910 | nd6 | 1.8830 | v6 | 40.81 |
|    | R12 | −778.000 | d11-BS= | 4.550 |  |  |  |  |
| BS |  |  | dBS= | 35.000 |  |  |  |  |
|    |  |  | dBS-S1= | 7.220 |  |  |  |  |
| S1 |  |  | dS1-13= | 5.600 |  |  |  |  |
| G7 | R13 | −134.770 | d13= | 8.810 | nd7 | 1.7234 | v7 | 37.96 |
|    | R14 | −47.550 | d14= | 8.380 |  |  |  |  |
| G8 | R15 | −29.750 | d15= | 3.580 | nd8 | 1.7015 | v8 | 41.24 |
|    | R16 | 134.770 | d16= | 94.640 |  |  |  |  |
| G9 | R17 | 185.770 | d17= | 11.220 | nd9 | 1.8810 | v9 | 40.14 |
|    | R18 | −778.000 | d18= | 102.893 |  |  |  |  | tric lens 20 as described in Embodiment 6, the field curvature S in FIG. 24 is field curvature in a sagittal direction, and T is a field curvature in a meridional direction.

Table 8 below shows values corresponding to various values in example 1, example 2, example 3, example 4, example 5, example 6, example 7, and the parameters specified in the relational expression.

As shown in Table 8, Embodiment 6 satisfies each relational expression.

In this embodiment, an entrance pupil diameter of the camera telecentric lens is 2624.704 mm, a full field of view image height is 18.5 mm, and a field of view in a diagonal direction is 0.03°, which has good optical performance.

Figure 26:
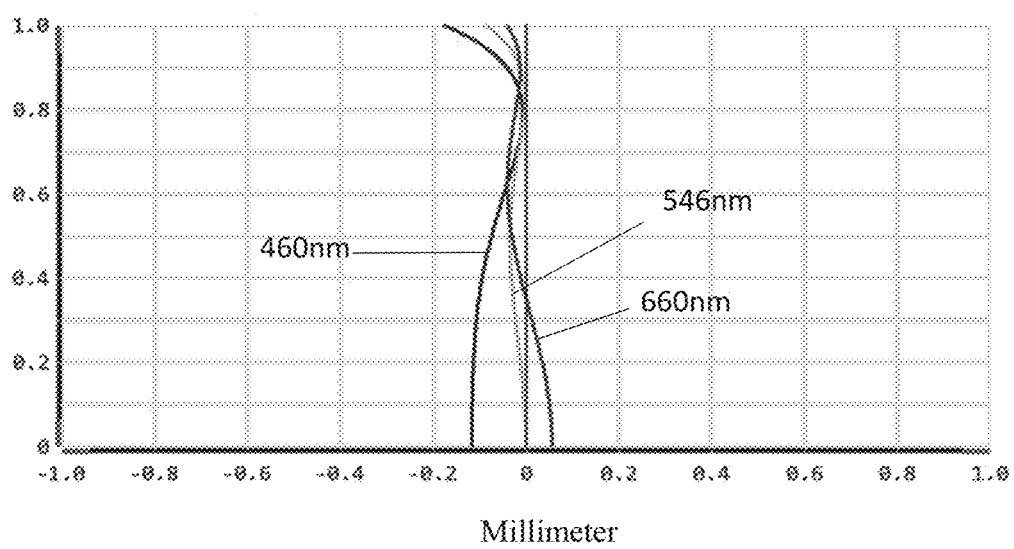
FIG. 26 is a schematic diagram of longitudinal aberration of the camera telecentric lens shown in FIG. 25.
Figure 27:
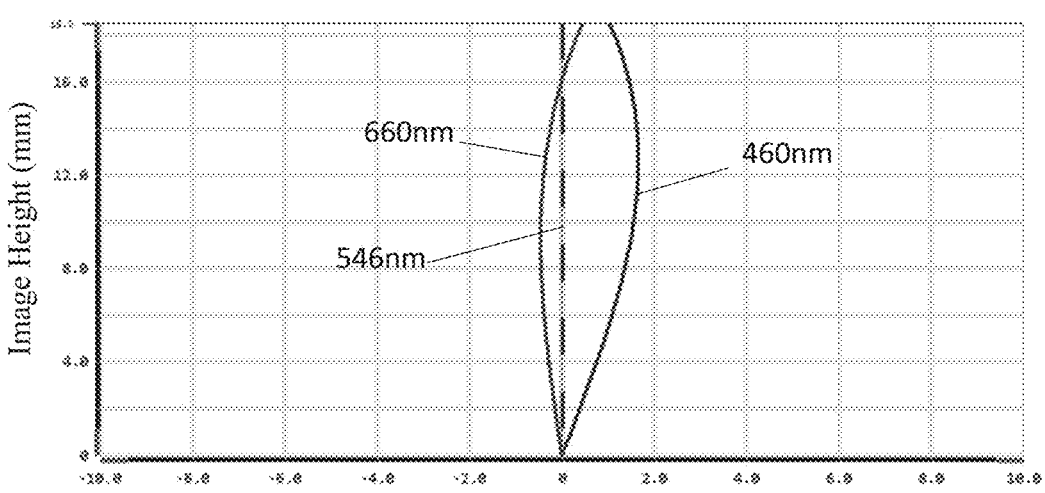
FIG. 27 is a schematic diagram of lateral color of the camera telecentric lens shown in FIG. 25.
Figure 28:
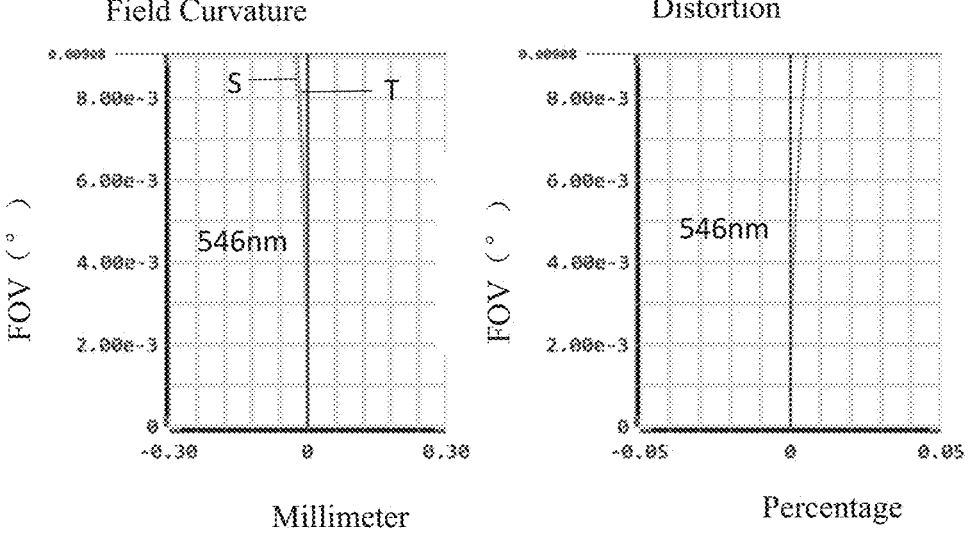
FIG. 28 is a schematic diagram of field curvature and distortion of the telecentric lens shown in FIG. 25.

FIG. 26 and FIG. 27 respectively show longitudinal aberration and lateral color of light with wavelengths 660 nm, 546 nm and 460 nm after passing through the camera telecentric lens 70 as described in Embodiment 7. FIG. 28 shows field curvature and distortion of light with a wavelength of 546 nm after passing through the camera telecentric lens 70 as described in Embodiment 7, the field curvature S in FIG. 28 is field curvature in a sagittal direction, and T is field curvature in a meridional direction.

Table 8 below shows values corresponding to various values in example 1, example 2, example 3, example 4, example 5, example 6, example 7, and the parameters specified in the relational expression.

As shown in Table 8, Embodiment 7 satisfies each relational expression.

In this embodiment, an entrance pupil diameter of the camera telecentric lens is 4516.334 mm, a full field of view image height is 18.5 mm, and a field of view in a diagonal direction is 0.02°, which has good optical performance.

TABLE 8

| Parameters and Relational Expression | Example 1 | Example 2 | Example 3 | Example 4 | Example 5 | Example 6 | Example 7 |
|---|---|---|---|---|---|---|---|
| n2 | 2.104 | 2.104 | 2.104 | 2.290 | 2.001 | 2.104 | 1.986 |
| f8/f | −0.235 | −0.151 | −0.053 | −0.225 | −0.270 | −0.595 | −0.239 |
| R4/R3 | 1.752 | 3.998 | 2.148 | 3.113 | 1.487 | 0.602 | 1.764 |
| NA*f/WD | 0.146 | 0.218 | 0.152 | 0.148 | 0.146 | 0.219 | 0.149 |
| f | 140.015 | 228.181 | 192.943 | 139.411 | 167.106 | 92.494 | 143.161 |
| f1 | 106.732 | 124.034 | 187.654 | 121.120 | 176.942 | 178.353 | 105.549 |
| f2 | 147.977 | 274.448 | 66.643 | 234.218 | 265.669 | −177.065 | 154.440 |
| f3 | −53.906 | −59.757 | −71.220 | −60.955 | −64.814 | 291.454 | −53.614 |
| f4 | 48.716 | 42.715 | 48.071 | 43.155 | 43.921 | 29.254 | 47.658 |
| f5 | −33.790 | −32.178 | −18.332 | −32.534 | −30.757 | −15.219 | −33.177 |
| f6 | 40.435 | 37.681 | 29.511 | 37.551 | 39.010 | 25.628 | 39.811 |
| f7 | 92.212 | 138.347 | 19.751 | 115.119 | 152.620 | 70.069 | 96.816 |
| f8 | −32.962 | −34.504 | −10.263 | −31.375 | −45.045 | −55.012 | −34.233 |
| f9 | 169.229 | 146.525 | 132.778 | 147.938 | 150.114 | 274.379 | 170.145 |

The above description is only embodiments of the present disclosure, and it should be noted that those skilled in the art can also make improvements without departing from the concept of the present disclosure, but these all fall within the protection scope of the present disclosure.

What is claimed is:

1. A camera telecentric lens, comprising from an object side to an image side: a first lens, a second lens, a third lens, a fourth lens, a fifth lens, a sixth lens, a seventh lens, an eighth lens and a ninth lens;

wherein a focal length of the camera telecentric lens is f, a refractive index of the second lens is n2, a central curvature radius of an object-side surface of the second lens is R3, a central curvature radius of an image-side surface of the second lens is R4, a focal length of the eighth lens is f8, a working distance of the camera telecentric lens is WD, and a numerical aperture of the camera telecentric lens is NA, following relational expressions are satisfied:

$$1.980 \le n2 \le 2.300;$$

$$-0.600 \le f8/f \le -0.050;$$

$$0.600 \le R4/R3 \le 4.000; \text{ and}$$

$$0.145 \le NA * f/WD \le 0.220.$$

2. The camera telecentric lens as described in claim 1, wherein a dispersion coefficient of the third lens is v3, a dispersion coefficient of the fourth lens is v4, a following relational expression is satisfied:

$$50.000 \le v4 - v3 \le 80.000.$$

3. The camera telecentric lens as described in claim 1, wherein a total optical length from an object-side surface of the first lens to an image plane of the camera optical lens along an optic axis of the camera telecentric lens is TTL, a following relational expression is satisfied:

$$2.000 \le TTL/f \le 5.000.$$

4. The camera telecentric lens as described in claim 1, wherein the first lens has a positive refractive power, and an image-side surface of the first lens is convex in a paraxial region;

a focal length of the first lens is f1, a central curvature radius of an object-side surface of the first lens is R1, a central curvature radius of the image-side surface of the first lens is R2, an on-axis thickness of the first lens is d1, and the total optical length from the object-side surface of the first lens to an image plane of the camera optical lens along an optic axis of the camera telecentric lens is TTL, following relational expressions are satisfied:

$$0.54 \le f1/f \le 1.95;$$

$$-0.50 \le (R1 + R2)/(R1 - R2) \le 4.01;$$

$$0.04 \le d1/TTL \le 0.06.$$

5. The camera telecentric lens as described in claim 1, wherein an object-side surface of the second lens is convex in a paraxial region, and an image-side surface of the second lens is concave in the paraxial region;

a focal length of the second lens is f2, an on-axis thickness of the second lens is d3, and the total optical length from an object-side surface of the first lens to an image plane of the camera optical lens along an optic axis of the camera telecentric lens is TTL, following relational expressions are satisfied:

$$-1.95 \le f2/f \le 1.70; \text{ and}$$

$$0.01 \le d3/TTL \le 0.05.$$

6. The camera telecentric lens as described in claim 1, wherein an object-side surface of the third lens is convex in the paraxial region, and an image-side surface of the third lens is concave in the paraxial region;

a focal length of the third lens is f3, a central curvature radius of the object-side surface of the third lens is R5, a central curvature radius of the image-side surface of the third lens is R6, an on-axis thickness of the third lens is d5, and a total optical length from an object-side surface of the first lens to an image plane of the camera optical lens along an optic axis of the camera telecentric lens is TTL, following relational expressions are satisfied:

$$-0.44 \le f3/f \le 3.20;$$

$$1.44 \le (R5 + R6)/(R5 - R6) \le 8928.08; \text{ and}$$

$$0.00 \le d5/TTL \le 0.02.$$

7. The camera telecentric lens as described in claim 1, wherein the fourth lens has a positive refractive power, an object-side surface of the fourth lens is convex in the paraxial region, and an image-side surface of the fourth lens is convex in the paraxial region;

a focal length of the fourth lens is f4, a central curvature radius of the object-side surface of the fourth lens is R7, a central curvature radius of the image-side surface of the fourth lens is R8, an on-axis thickness of the fourth lens is d7, and the total optical length from an object-side surface of the first lens to an image plane of the camera optical lens along an optic axis of the camera telecentric lens is TTL, following relational expressions are satisfied:

$$0.18 \le f4/f \le 0.35;$$

$$-0.35 \le (R7 + R8)/(R7 - R8) \le -0.10; \text{ and}$$

$$0.01 \le d7/TTL \le 0.05.$$

8. The camera telecentric lens as described in claim 1, wherein the fifth lens has a negative refractive power, an object-side surface of the fifth lens is concave in the paraxial region, and an image-side surface of the fifth lens is concave in the paraxial region;

a focal length of the fifth lens is f5, a central curvature radius of the object-side surface of the fifth lens is R9, a central curvature radius of the image-side surface of the fifth lens is R10, an on-axis thickness of the fifth lens is d9, and a total optical length from an object-side surface of the first lens to an image plane of the camera optical lens along an optic axis of the camera telecentric lens is TTL, following relational expressions are satisfied:

$$-0.25 \le f5/f \le -0.09;$$

$$0.12 \le (R9 + R10)/(R9 - R10) \le 0.45;$$

$$0.00 \le d9/TTL \le 0.03.$$

9. The camera telecentric lens as described in claim 1, wherein the sixth lens has a positive refractive power, an object-side surface of the sixth lens is convex in the paraxial region, and an image-side surface of the sixth lens is convex in the paraxial region;

a focal length of the sixth lens is f6, a central curvature radius of the object-side surface of the sixth lens is R11, a central curvature radius of the image-side surface of the sixth lens is R12, a thickness on-axis of the sixth lens is d11, and the total optical length from an object-side surface of the first lens to an image plane of the camera optical lens along an optic axis of the camera telecentric lens is TTL, following relational expressions are satisfied:

$$0.15 \le f6/f \le 0.29;$$

$$-1.00 \le (R11 + R12)/(R11 - R12) \le -0.33; \text{ and}$$

$$0.01 \le d11/TTL \le 0.06.$$

10. The camera telecentric lens as described in claim 1, wherein the seventh lens has a positive refractive power;

a focal length of the seventh lens is f7, a central curvature radius of an object-side surface of the seventh lens is R13, a central curvature radius of an image-side surface of the seventh lens is R14, an on-axis thickness of the seventh lens is d13, and a total optical length from an object-side surface of the first lens to an image plane of the camera optical lens along an optic axis of the camera telecentric lens is TTL, following relational expressions are satisfied:

$$0.10 \le f7/f \le 0.95;$$

$$-2.80 \le (R13 + R14)/(R13 - R14) \le 2.10; \text{ and}$$

$$0.00 \le d13/TTL \le 0.06.$$

11. The camera telecentric lens as described in claim 1, wherein the eighth lens has a negative refractive power, and an object-side surface of the eighth lens is concave in the paraxial region;

a central curvature radius of the object-side surface of the eighth lens is R15, a central curvature radius of the image-side surface of the eighth lens is R16, an on-axis thickness of the eighth lens is d15, and a total optical length from an object-side surface of the first lens to an image plane of the camera optical lens along an optic axis of the camera telecentric lens is TTL, following relational expressions are satisfied:

$$-2.00 \le (R15 + R16)/(R15 - R16) \le 0.16; \text{ and}$$

$$0.00 \le d15/TTL \le 0.03.$$

12. The camera telecentric lens as described in claim 1, wherein the ninth lens has a positive refractive power;

a focal length of the ninth lens is f9, a central curvature radius of an object-side surface of the ninth lens is R17, a central curvature radius of an image-side surface of the ninth lens is R18, an on-axis thickness of the eighth lens is d17, and a total optical length from an object-side surface of the first lens to an image plane of the camera optical lens along an optic axis of the camera telecentric lens is TTL, following relational expressions are satisfied:

$$0.64 \le f9/f \le 2.97;$$

$$-32.02 \le (R17 + R18)/(R17 - R18) \le 2.00; \text{ and}$$

$$0.01 \le d17/TTL \le 0.08.$$

13. The camera telecentric lens as described in claim 1, wherein the first lens, the second lens, the third lens, the fourth lens, the fifth lens, the sixth lens, the seventh lens, the eighth lens and the ninth lens are all made of glass.

\* \* \* \* \*